United States Patent
Hinoue et al.

[19]

[11] Patent Number: 6,118,485
[45] Date of Patent: Sep. 12, 2000

[54] CARD TYPE CAMERA WITH IMAGE PROCESSING FUNCTION

[75] Inventors: Sadahiko Hinoue, Nara; Tetsuya Taki; Masako Nakanishi, both of Nara-ken; Hiroyoshi Toda; Toyofumi Horikawa, both of Yamatokooriyama, all of Japan

[73] Assignee: Sharp Kabushiki Kaisha, Osaka, Japan

[21] Appl. No.: 08/976,581

[22] Filed: Nov. 24, 1997

Related U.S. Application Data

[63] Continuation of application No. 08/442,960, May 17, 1995, abandoned.

[30] Foreign Application Priority Data

| May 25, 1994 | [JP] | Japan | 6-110891 |
| May 18, 1994 | [JP] | Japan | 6-103696 |

[51] Int. Cl.⁷ ............................................. H04N 5/225
[52] U.S. Cl. .................... 348/373; 348/220; 348/231; 348/552
[58] Field of Search .................... 348/207, 220, 348/231, 223, 373, 374, 375, 552, 578, 232; 358/335

[56] References Cited

U.S. PATENT DOCUMENTS

| 3,777,636 | 12/1973 | Imura et al. | 396/251 |
| 3,791,273 | 2/1974 | Beach | 396/276 |
| 5,063,448 | 11/1991 | Jaffray et al. | 348/578 |
| 5,153,730 | 10/1992 | Nagasaki et al. | 348/231 |
| 5,231,501 | 7/1993 | Sakai | 348/231 |
| 5,475,441 | 12/1995 | Parulski et al. | 348/552 |
| 5,535,011 | 7/1996 | Yamagami et al. | 358/335 |
| 5,808,672 | 9/1998 | Bayashi et al. | 348/220 |

FOREIGN PATENT DOCUMENTS

| 382581 | 8/1990 | European Pat. Off. | H04N 1/40 |
| 0617543 | 9/1994 | European Pat. Off. | H04N 5/76 |
| 61-154368 | 7/1986 | Japan | H04N 5/225 |
| 1-176168 | 7/1989 | Japan | H04N 5/225 |
| 1183638 | 7/1989 | Japan | G03B 7/18 |
| 4-295886 | 10/1992 | Japan | G09G 5/00 |
| 414274 | 6/1994 | WIPO | H04N 1/21 |

OTHER PUBLICATIONS

Uomori et al., Automatic Image Stabilizing System by Full–Digital Signal Processing, Aug. 1990, pp. 510–519.

*Primary Examiner*—Tuan Ho

[57] ABSTRACT

An IC card unit has a memory, various types of image processing sections, and an IC card interface and, when fitted to an external information processing device, it is contained therein. An image input unit, which has an image forming part and an image pick-up part and which is protruded outward of the information processing device, captures an image of a subject. The image processing sections execute image processing on image data written into the memory, and converts the data into image data optimum for display by an image display of the information processing device. The IC card interface transmits image data that has undergone the image processing to the information processing device side, enabling real-time monitoring. Access from the information processing device side is enabled so that image processing conditions and the like can be set.

33 Claims, 22 Drawing Sheets

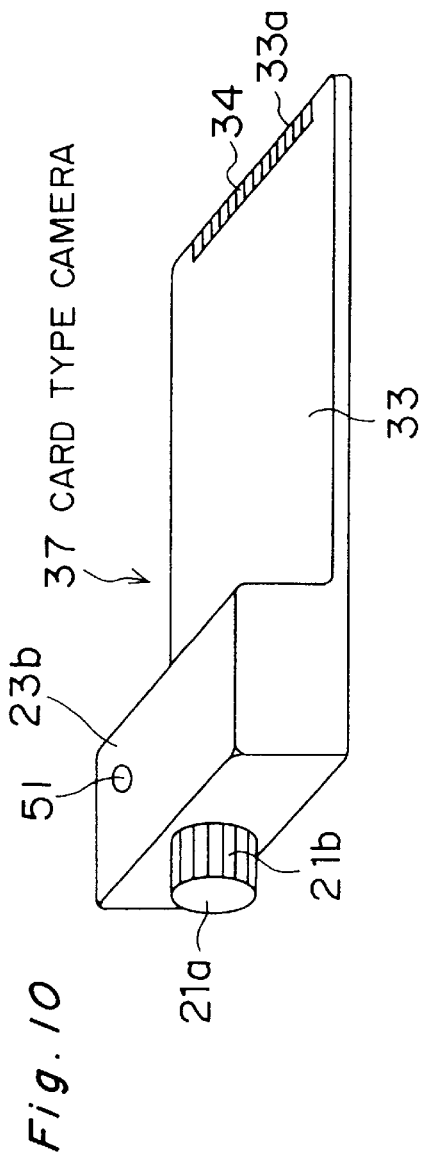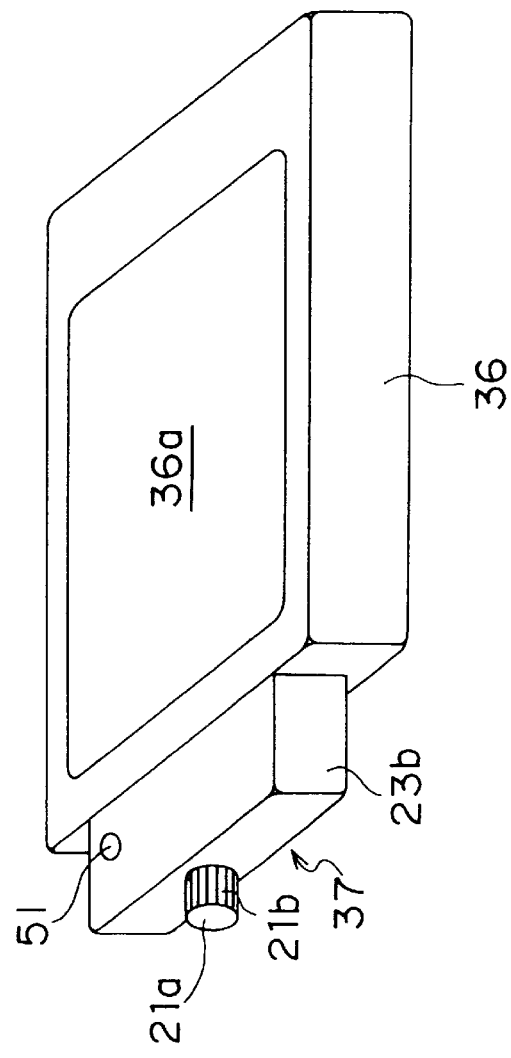

CARD TYPE CAMERA WITH IMAGE PROCESSING FUNCTION

This application is a continuation of application Ser. No. 08/442,960 filed on May 17, 1995, now abandoned.

BACKGROUND OF THE INVENTION

1. Field of the Invention

The present invention relates to a card type camera which is used in connection with an information processing device such as electronic notebooks or other portable information equipment, personal word processors, and personal computers.

2. Description of the Background Art

A conventional electronics still camera is disclosed in Japanese Patent Laid-Open Publication No. HEI 1-176168. FIGS. 1, 2, and 3 are a front view, a side view, and a circuit block diagram of the electronics still camera, respectively. The electronics still camera 1 comprises a card camera having an image input unit, which is composed of a lens 4 and a CCD (Charge-Coupled Device) 5, provided in the center of a card-like body 3 as shown in FIGS. 1 and 2. In connection with an exclusive-use reproducing section 2 (see FIG. 3) via connectors 6, the electronics still camera 1 reproduces still image information written in image-use memory.

Referring to FIG. 3, drive pulses are generated by a drive pulse generator 8 based on a timing signal derived from a synchronizing signal generator 7, whereby a drive signal for the CCD 5 is generated by a drive circuit 9. Then, an output signal from the CCD 5 is sampled by a sample hold circuit 10, gain-controlled by an AGC (Automatic Gain Control) compressor 11, and thereafter log-compressed. The log-compressed signal is converted into a digital signal by an A/D (Analog-to-Digital) converter 12, and then log-expanded by an expander 13. Further, it undergoes such processes as color separation, horizontal/vertical edge correction, γ-correction, and white balance by a processor 14. R, G, and B signals obtained in this way are stored via a data buffer 15 into an image memory 16 composed of R memory, G memory, and B memory.

The R, G, and B signals thus stored in the image memory 16 are transmitted to the reproducing section 2 via the connectors 6. Then, they are converted into analog signals by a D/A (Digital-to-Analog) converter 17 of the reproducing section 2, and amplified by an image amplifier 18. Thus, a still image is displayed on a monitor 19 based on the amplified analog signals. Various types of image processing involved in this display process for the picked-up still image are executed by an unshown image processing unit on the reproducing section 2 side.

In the above-described electronics still camera 1, as shown in FIGS. 1 and 2, an image input unit composed of a lens 4 and a CCD 5 is provided in the center of the card-like body 3, while connectors 6 are provided on a side edge. Therefore, when the electronics still camera 1 is operated to pick up an image under real-time monitoring in connection with the exclusive-use reproducing section 2, the generally entire body 3 except the connectors 6 is projected from the reproducing section 2. This results in a poor convenience of use, as a problem.

Also in the electronics still camera 1, no special image processing is executed upon the R, G, and B signals that have been converted into digital form by the A/D converter 12 and stored in the image memory 16. Thus, various types of image processing, when executed upon the digitized R, G, and B signals, need to be done by the image processing unit on the reproducing section 2 side as described above. Therefore, it is necessary to allow a processing time before the picked-up image is reproduced. This poses another problem that the image cannot be captured under the real-time checking of the focusing state, or that the focusing adjustment cannot be attained manually. As still another problem, when the reproducing section has a display device incapable of multi-level halftone display, such as liquid crystal display devices, a high-grade image cannot be displayed directly.

Also in the electronics still camera 1, since hand moves may occur during the hand-hold photographing, only one-side field image signals out of the image signals derived from the CCD 5 can be used. This causes a problem that the vertical resolution deteriorates to one half. An FIT (Fail-In-Time) type CCD may be used to avoid such a problem, but this would result in a great increase in cost.

Also in the electronics still camera 1, when it is connected to the reproducing section 2, one-way access only from the electronics still camera 1 side is permitted. Therefore, the image memory 16 cannot be accessed from the reproducing section 2 side. As a result, it is impossible to read necessary image data stored in the image memory 16 from the reproducing section 2 side, execute image processing on them, and transfer the processing results to the electronics still camera 1 once again.

Further, the lens 4 is projected vertical to a direction in which the card-like body 3 extends. As a result, when the electronics still camera 1 is connected to the exclusive-use reproducing section 2, the direction of the subject relative to the direction of the display screen of the reproducing section 2 is limited naturally. This leads to a further problem that subjects in various directions cannot be photographed in a state that the display screen of the reproducing section 2 is set up to be easy to monitor.

Also in the electronics still camera 1, whereas image data of a subject is captured by pressing a shutter switch 20, the camera 1 is not provided with the function of producing a shutter sound at the press of the shutter switch 20. As a result, the operator cannot be sure that image data of the subject has been captured by an operation of the shutter switch.

SUMMARY OF THE INVENTION

A first object of the present invention is therefore to provide a user-friendly card type camera which is capable of executing image processing upon digital image data stored in memory, being connected to an external information processing device, allowing real-time monitoring from the connected information processing device side, and gaining access to the memory from the external information processing device side.

A second object of the present invention is to provide a user-friendly card type camera which, when fitted to an external information processing device, is contained in the information processing device except for its image input unit, and which is not restricted in the direction of the subject by the direction of the display screen of the information processing device, and moreover which allows the capture of image data of a subject to be confirmed by a shutter sound.

In order to achieve the above first object, there is provided a card type camera comprising an image input unit having an image forming part for forming an image of a subject on an image forming surface and an image pick-up part for capturing the image on the image forming surface and generating digital image data, and an IC (Integrated Circuit) card unit having a memory, a memory controller, and a connector, wherein image data from the image input unit is stored in the memory and the stored image data is transferred to an external information processing device electrically connected to the card type camera via the connector, the IC card unit further comprising:

an image processing means for implementing image processing on image data transferred from the image input unit or on image data read from the memory; and an interface connected to the connector and to the memory, the memory controller, and the image processing means, and serving for data transmission and reception between at least one of the memory, the memory controller and the image processing means, and the information processing device.

With the above arrangement, image processing upon image data derived from the image input unit or upon image data stored in the memory can be executed on the card types camera side. Besides, image data that has undergone the image processing can be transferred to the information processing device by the interface. Accordingly, a high-grade image can be displayed at high speed on an image. display unit of the information processing device, and therefore can be monitored in real time on the information processing device side. Also, data can be transmitted and received between either one of the memory or the memory controller and the information processing device by the IC card interface, so that image data can be read from or written into the memory under the control of the memory controller based on address data transmitted from the information processing device side. Accordingly, image processing can be executed by the information processing device upon image data captured by the card type camera, or image processing can be executed on the card type camera side upon image data from the information processing device.

In an embodiment, the image processing means comprises at least one of an error diffuser for implementing an error diffusion process on image data transferred from the image input unit or on image data read from the memory, and an adaptive binarizer for implementing an adaptive binarization process in which a threshold is adaptively changed according to an ambient brightness to image data transferred from the image input unit or to image data read from the memory.

In this card type camera, when the image processing means comprises an error diffuser, image data of an image captured by the image pick-up part of the image input unit is stored in the memory of the IC card under the control of the memory controller. Then, an error diffusion process is executed by the error diffuser upon image dates transmitted from the image input unit or upon image data read from the memory. Subsequently, the image data that has undergone the error diffusion process is transferred by the IC card interface to the information processing device electrically connected to the card type camera via a connector.

In the above process, when a threshold used for the error diffusion process is transferred from the information processing device via the connector, the threshold is transmitted by the IC card interface to the error diffuser. Then, the subsequent error diffusion process by the error diffuser is performed by using a new threshold derived from the information processing device.

Further, data transmission and reception between at least one of the memory and the memory controller, and the information processing device is executed by the IC card interface. Based on address data from the information processing device, image data is read from or written into the memory under the control of the memory controller.

The card type camera with the above arrangement has the following advantages by virtue of comprising the error diffuser:

(1) An error diffusion process can be executed at high speed on the card type camera side upon image data derived from the image input unit or upon image data stored in the memory;

(2) Image data that has undergone the error diffusion process can be transferred by the IC card interface to the information processing device. Therefore, a high-grade image can be displayed at high speed on the image display of the information processing device, so that the image can be monitored in real time on the information processing device side; and (3) A threshold that is transferred from the information processing device and used for the error diffusion process can be transmitted by the IC card interface to the error diffuser. Therefore, with the threshold changed from the information processing device side, an error diffusion process corresponding to the number of halftone levels of display by the image display of the information processing device can be implemented. That is, when the image display is a liquid crystal display capable of low-level halftone display, a natural image can be displayed in a halftone corresponding to the number of halftone levels of the image display.

Also, when the image processing means comprises the adaptive binarizer, an adaptive binarization process is executed by the adaptive binarizer upon image data transmitted from the image input unit or upon image data read from the memory. Then, the image data that has undergone the adaptive binarization process is transferred by the IC card interface to the information processing device electrically connected to the card type camera via a connector.

Unique advantages by the provision of the adaptive binarizer are as follows:

(1) An adaptive binarization process can be executed at high speed on the card type camera side upon image data derived from the image input unit or upon image data stored in the memory; and (2) Image data that has undergone the adaptive binarization process can be transferred by the IC card. interface to the information processing device. Accordingly, a high-grade, binary image can be displayed at high speed on a liquid crystal display of the information processing device, and the image can be monitored in real time on the information processing device side.

In an embodiment, the IC card comprises both the error diffuser and the adaptive binarizer.

In this case, an error diffusion process is executed by the error diffuser upon image data transmitted from the image input unit or upon image data read from the memory, while an adaptive binarization process is executed by the adaptive binarizer upon the image data. Then, the image data that has undergone the error diffusion process and the image data that has undergone the adaptive binarization process are transferred by the IC card interface to the information processing device.

Therefore, regardless of whether or not the image display means of the information processing device is capable of multi-level halftone display, a high-grade image can be displayed at high speed on the image display. Further, a character image, when involved, can be displayed as an image having clear edges through the adaptive binarization process, and a natural image, when involved, can be displayed as a more natural image through the error diffusion process.

In addition, when a threshold to be used for the error diffusion process is transferred from the information processing device, the threshold is transmitted by the IC card interface to the error diffuser. Then, the subsequent error diffusion process by the error diffuser is performed by using a new threshold transmitted from the information processing device.

In an embodiment, the image processing means further comprises a brightness converter for implementing a brightness conversion process by referring to a conversion table on the image data.

In this card type camera, a brightness conversion process by reference to a conversion table is executed by the brightness converter upon the image data. In this process, when update information of the conversion table is transferred from the information processing device, the update information is transmitted by the IC card interface to the brightness converter. Then, the subsequent brightness conversion process by the brightness converter is executed by reference to the updated conversion table. This means that the contents of the conversion table can be updated from the information processing device side. Accordingly, an image can be displayed on the image display at a brightness corresponding to the characteristics of the image display of the information processing device.

In an embodiment, the image processing means further comprises an edge enhancer for implementing an edge enhancement process by which a brightness value of a pixel having more than a specified difference in brightness from those of neighboring pixels is further enhanced based on the image data.

In this case, an edge enhancement process for further enhancing the brightness value of pixels having more than a specified brightness difference from those of neighboring pixels can be executed based on the image data.

Therefore, previous reinforcement can be applied so that edge portions will not be deteriorated by later-executed image processing, or image information on deteriorated edge portions can be restored. Thus, the image processing means in this case is optimum for displaying character images.

In an embodiment, the image processing means further comprises an edge amount detector for detecting a number of pixels having more than a specified difference in brightness from those of neighboring pixels as an edge amount based on the image data.

In this case, the edge amount is transferred by the IC card interface to the information processing device. Therefore, on the information processing device side, the focusing state of the image that is currently captured and displayed can be known in real time based on the edge amount representing the relative amount of high-frequency components contained in the image. Thus, focusing adjustment under the viewing of a poor-contrast LCD can be easily attained.

In an embodiment, the image processing means further comprises a hand-move corrector for detecting a shift amount between two field images constituting a frame image as an offset amount for a read address of either one of the two field images based on image data transferred from the image input unit, and then transferring the offset amount to the memory controller as address information for reading the frame image from the memory.

In this case, based on the image data transmitted from the image input unit, a shift amount between two field images constituting a frame image is detected as an offset amount of the read address for either one of the two field images, and transmitted to the memory controller, by the hand-move corrector. Then, when the one of the two field images constituting the relevant frame image is read from the memory, the address for access to the memory is so set as to be shifted responsively to the above offset amount, by the memory controller.

The shift between the two field images constituting the relevant frame image is corrected in this way, whereby hand-movement of the camera is corrected.

Thus, the card type camera equipped with the hand-move corrector can correct any shift between two field images in reading image data of the relevant frame image from the memory, under the control of the memory controller. As a result, the card type camera is capable of hand-move correction.

In an embodiment, the hand-move corrector comprises:

a difference calculating means for calculating differences between brightness values of a plurality of representative pixels in either one of two field images constituting a frame image, and brightness values of all pixels in a specified area taking pixels in the other field image corresponding to the representative pixels each as a reference position, based on image data transferred from the image input unit;

a remaining-difference table generating means for generating a remaining-difference table by adding up absolute values of the differences relating to the corresponding pixels in each specified area for every specified area, based on calculation results by the difference calculating means; and an offset detecting means for detecting a shift amount from a reference position of an element that gives a minimum value in the remaining-difference table as an offset value for a read address of the other field image.

These means allow the hand-move correction process to be easily accomplished by simple processing.

Also, in order to achieve the second object, the present invention provides a card type camera comprising an image input unit having an image forming part for forming an image of a subject on an image forming surface and an image pick-up part for capturing the image on the image forming surface and generating digital image data, and an IC card unit having a memory, a memory controller, and at connector, wherein image data from the image input unit is stored in the memory and the stored image data is transferred to an external information processing device electrically connected to the card type camera via the connector, the IC card unit is card-like shaped and insertable into the information processing device through a card slot provided in the information processing device.

In an embodiment, the image input unit is provided at an end portion on a side opposite to a side on which the IC card unit is inserted into the information processing device, and the image input unit is protruded out of the information processing device when the IC card unit is fitted to and electrically connected to the information processing device.

In this card type camera, its IC card unit is inserted through a card slot provided in an external information processing device into the information processing device, where the card type camera is electrically connected to the information processing device via a connector. In this arrangement, the IC card unit is card-like shaped and the image input unit is provided at an end portion of the card type camera on a side opposite to the side on which the IC card unit is inserted into the information processing device.

Therefore, the IC card unit is contained in the information processing device and the image input unit for capturing an image is projected out of the information processing device, so that the resultant configuration is as if it were one camera unit.

Thus, image data obtained by the image input unit is stored in the memory of the IC card unit under the control of the memory controller. The image data stored in the memory is read, as required, from the memory under the control of the memory controller, and transferred (by the interface) to the information processing device via the connector, so that the image is displayed on the display screen.

This card type camera, when fitted to the information processing device, is convenient to use for photographing by displaying in real time an image on the display screen of the information processing device, because the IC card unit is not projected from the information processing device.

In an embodiment, the image input unit has a body and the image forming part coupled with the body by a movable means, and a direction of an incident-side optical axis of the image forming part is changeable relative to a direction in which the IC card unit extends.

In this case, when the IC card unit is contained in the information processing device, an optical axis of the image forming part on the incident side can be varied relative to the direction in which the IC card unit extends, by an operation of the movable means of the image input unit projected out of the information processing device. Therefore, the operator is enabled to photograph with the display screen of the information processing device set to be easy to monitor, without being affected by the direction of the subject.

In another embodiment, the image input unit is provided independently of the IC card unit, and there is provided an image data transfer means for transferring image data derived from the image input unit to the IC card unit. Also, the image input unit and the IC card unit each have a connecting means for connecting them to each other and an attaching means for removably attaching them to each other, and the image data transfer means transfers image data derived from the image input unit separated from the IC card unit to the IC card unit via the connecting means.

In this case, image data transferred from the image input unit provided independently of the IC card unit and directed toward an arbitrary direction or from the image input unit separated from the IC card unit and directed toward an arbitrary direction is transferred by the image data transfer means to the IC card unit.

Thus, the photographing is performed while the direction of the subject is not restricted at all by the direction of the display screen of the information processing device.

In an embodiment, there is provided a shutter switch for, when pressed, outputting an interrupt signal;

a shutter sound generator for generating a shutter sound on reception of a sound signal transferred from the information processing device based on the interrupt signal, and an interface for performing signal transmission and reception between the shutter switch and the shutter sound generator, and the information processing device.

In this case, an interrupt signal is outputted at a press of the shutter switch, and transferred by the interface to the information processing device. Meanwhile, when a sound signal transferred by the interface from the information processing device based on the interrupt signal is transmitted to the shutter sound generator, a shutter sound is generated by the shutter sound generator. In this way, a shutter sound is generated when the shutter switch is pressed. Therefore, the operator is allowed to photograph while making sure by the shutter sound that image data has been captured from the image input unit.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 10 is an external view of a card type camera of the present invention having a configuration different from that of FIG. 5;

FIG. 11 is a view showing an example that the card type camera of FIG. 10 is fitted to a portable information device;

DETAILED DESCRIPTION OF THE PREFERRED EMBODIMENTS

The present invention is described in detail hereinbelow by embodiments thereof illustrated in the accompanying drawings.

Figure 4:
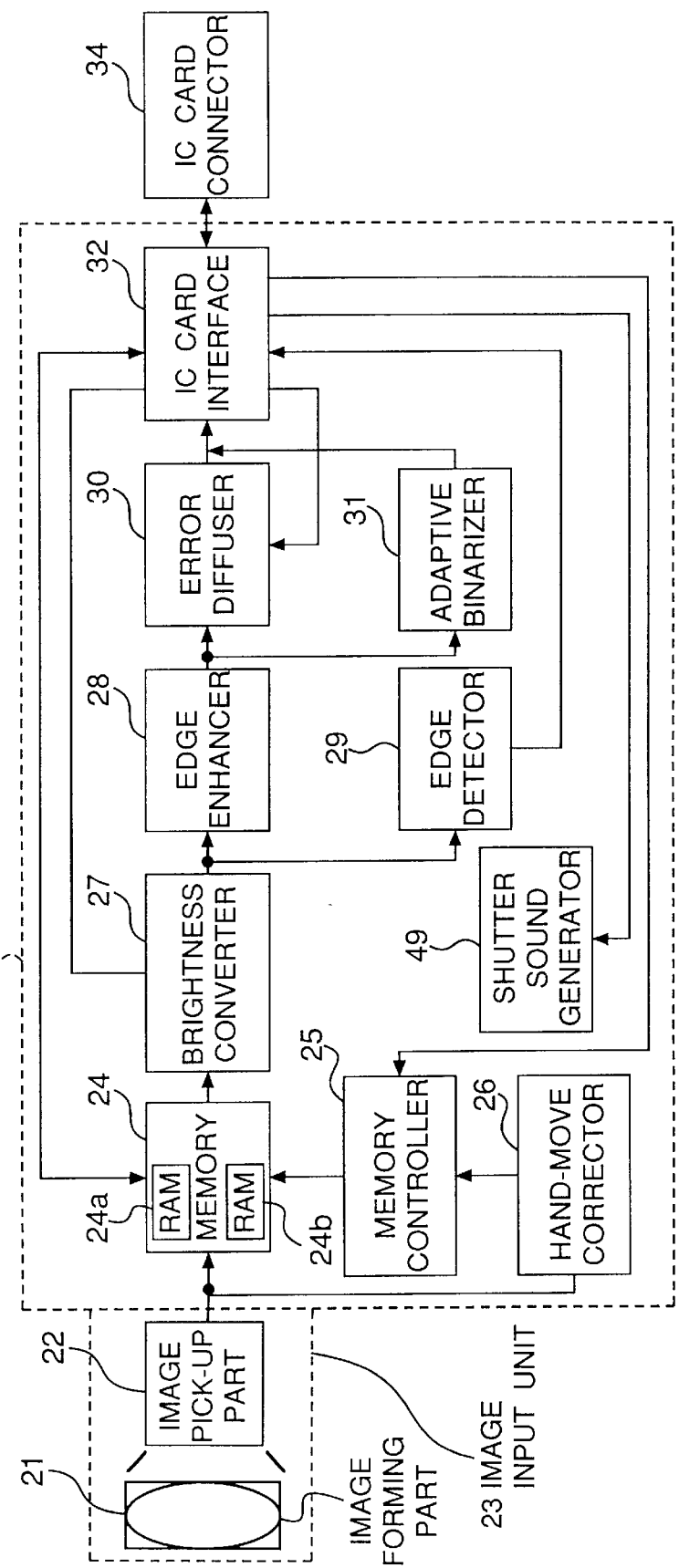
FIG. 4 is a block diagram of a card type camera of the present invention.

FIG. 4 is a block diagram of a card type camera of an embodiment of the present application.

This card type camera is made up generally of an image input unit 23 and an IC card unit 33. The image input unit 23 is composed of an image forming part 21 comprising an optical lens and the like, and an image pick-up part 22 comprising a CCD, a CCD drive circuit, an A/D converter, and the like. The IC card unit 33 comprises a memory 24, a memory controller 25, a hand-move corrector 26, a brightness converter 27, an edge enhancer 28, an edge amount detector 29, an error diffuser 30, an adaptive binarizer 31, and an IC card interface 32, all of which are contained in a card-like body in the form of LSI (Large-Scale Integrated circuit).

The IC card unit 33 has an IC card connector 34 provided at a side edge thereof and connected to the IC card interface 32. This allows the IC card unit 33 to be connected to an external portable information device or information processing devices such as personal word processors and personal computers.

Figure 5:
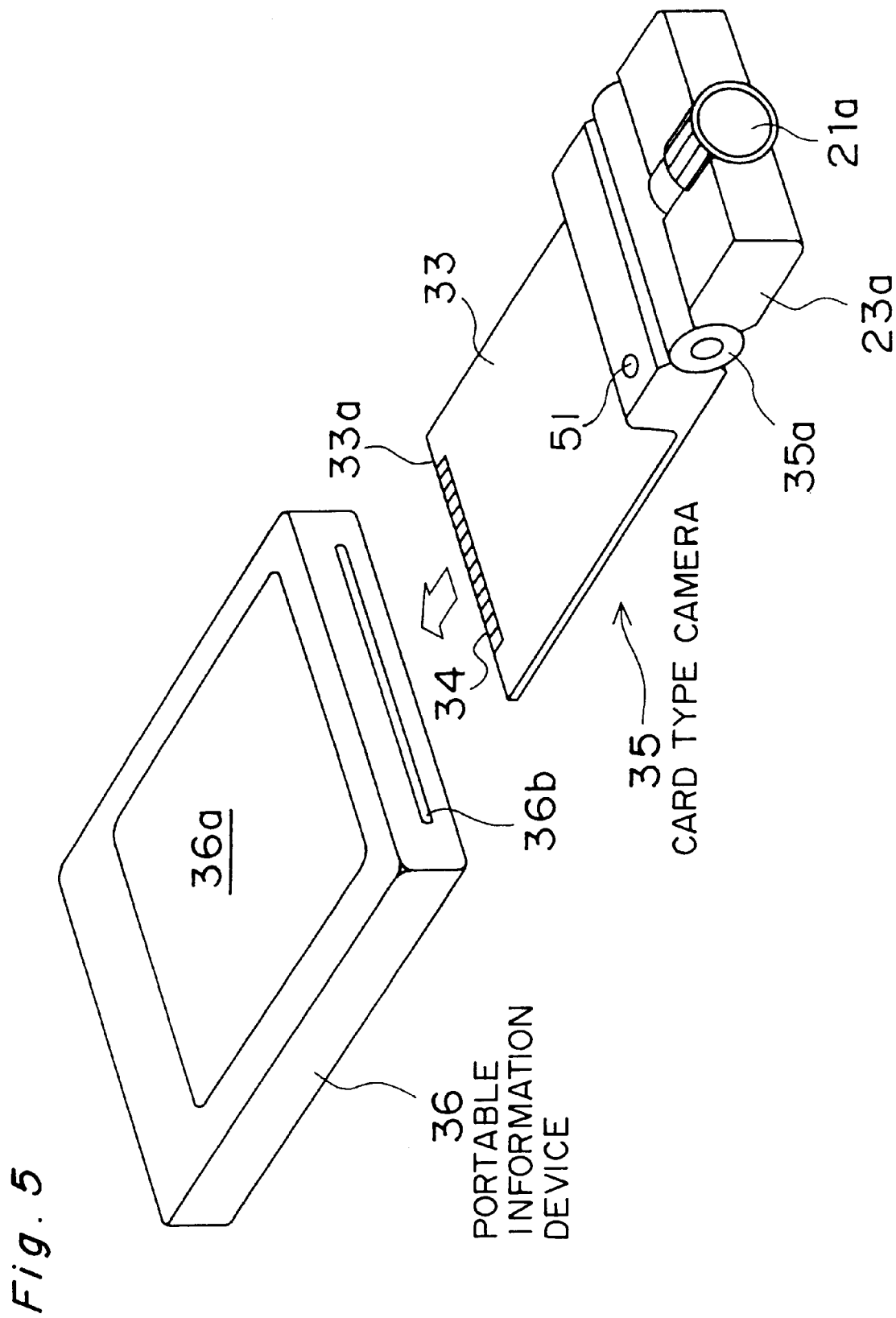
FIG. 5 is an external view of an example of the card type camera shown in FIG. 4 and a view showing an example that the card type camera is fitted to a portable information device.

FIG. 5 is an external view of an example of the card type camera and a portable information device of the electronic notebook type, which is an example of the external information processing device to which the card type camera is fitted.

As described above, the IC card unit 33 of the card type camera 35 is card-like shaped and has an image input unit 23a provided at an end portion thereof. The image input unit 23a is arranged to be bendable at a hinge 35a serving as a movable mechanism. Thus, the angle of the optical axis of a lens 21a forming the image forming part 21 with respect to the surface of the IC card unit 33 is variable.

The card type camera 35 is fitted to a portable information device 36 by inserting the IC card unit 33 into a slot 36b of the portable information device 36. The IC card connector 34 provided at an edge 33a of the other end of the IC card unit 33 is connected to a connector provided inside the portable information device 36.

Therefore, an image captured from the image input unit 23a of the card type camera 35 can be displayed on a display screen 36a of the portable information device 36 in real time, or results of image processing, which will be described later, executed upon the image data temporarily stored in the memory 24 (see FIG. 4) can be displayed on the display screen 36a. It is noted that reference numeral 51 denotes a shutter switch and 49 (see FIG. 4) denotes a shutter sound generator for generating a shutter sound.

Figure 6:
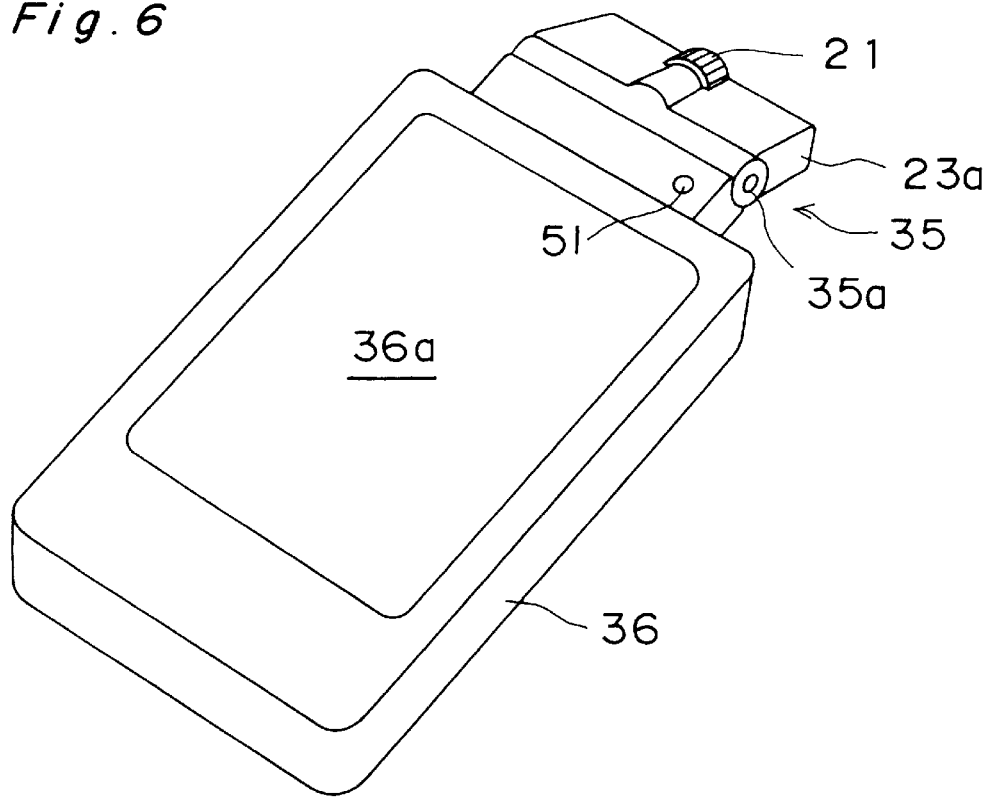
FIGS. 6, 7, and 8 are views showing different operation examples of the image input unit of the card type camera shown in FIG. 5.

FIG. 6 is a view in which the card type camera 35 has been fitted to the portable information device 36. In this case, although the IC card unit 33 is inserted into the portable information device 36 so as to be hidden, the image input unit 23a is projected out of the portable information device 36 so that photographing is possible. With this arrangement, by turning the image input unit 23a about the hinge 35a, subjects in various directions with respect to the display screen 36a of the portable information device 36 can be photographed.

Figure 7:
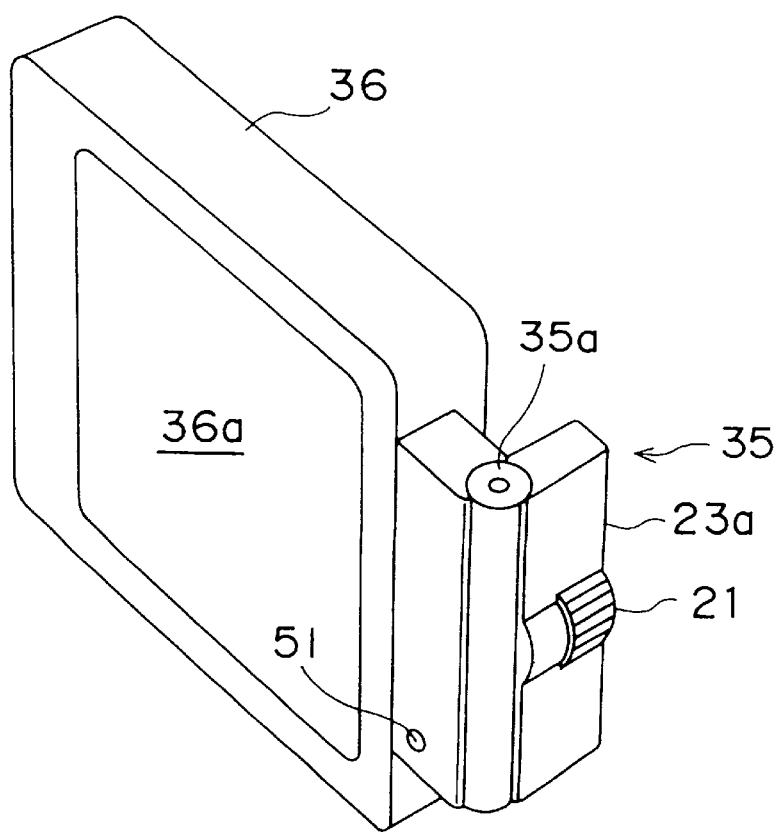
Figure 8:
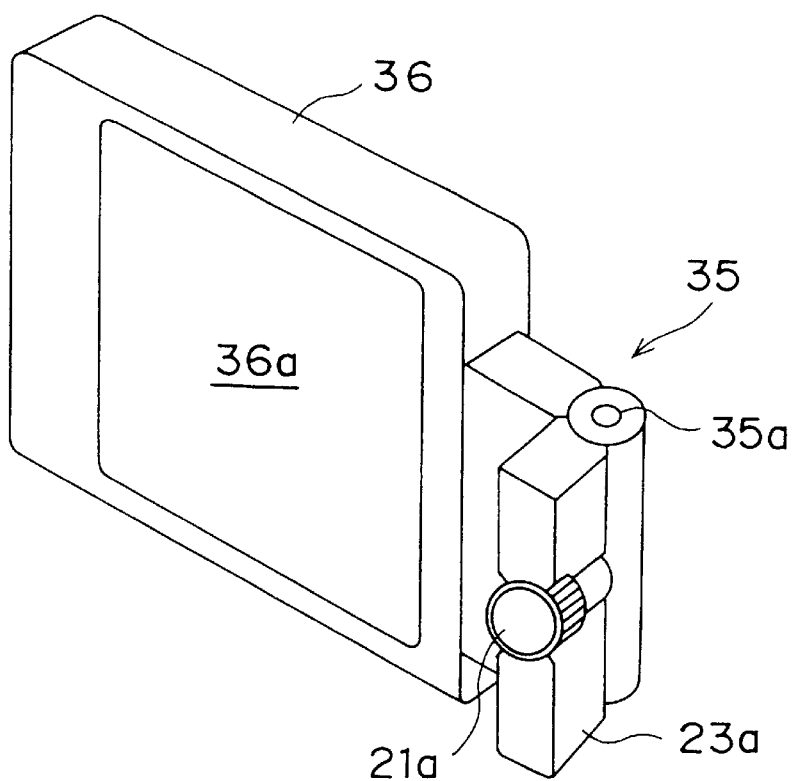

For example, in the case of FIG. 6, subjects in the forward direction can be photographed by positioning the display screen 36a generally horizontal. In the case of FIG. 7, subjects in the forward direction can be photographed by positioning the display screen 36a vertical, while subjects in the downward direction can be photographed by positioning the display screen 36a horizontal. In the case of FIG. 8, subjects in the backward direction can be photographed by positioning the display screen 36a vertical, while subjects in the upward direction can be photographed by positioning the display screen 36a horizontal.

Figure 9:
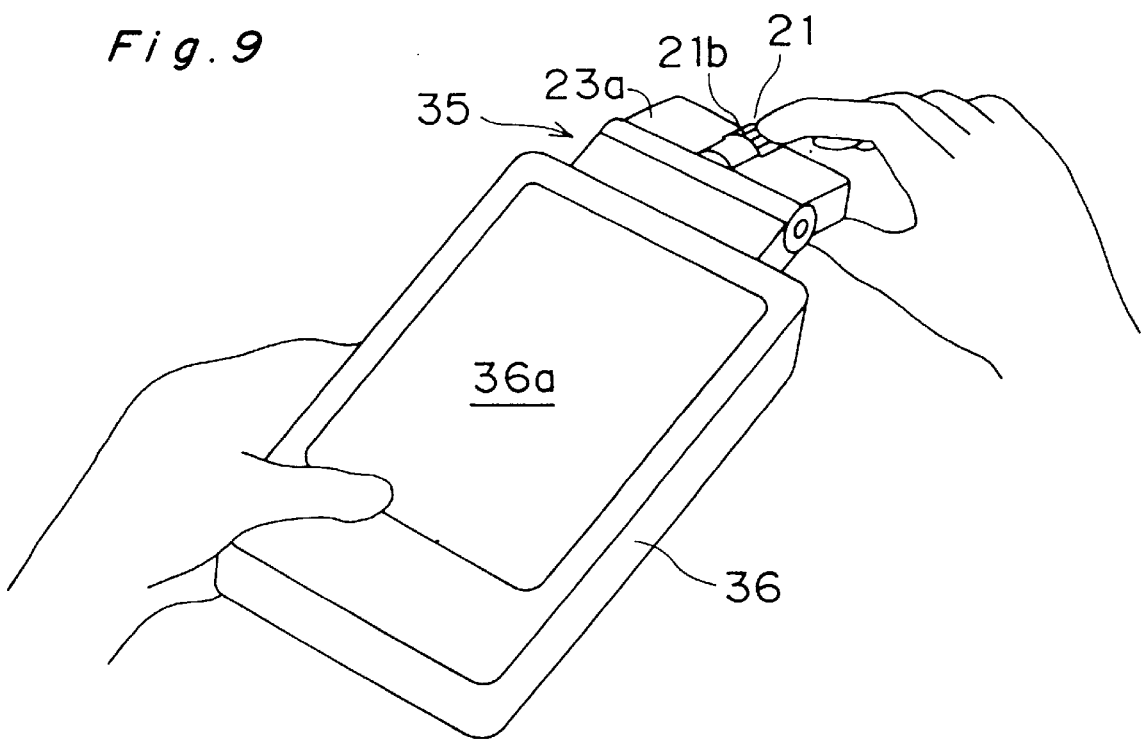
FIG. 9 is a view showing focusing adjustment of the card type camera shown in FIG. 5.

Focusing adjustment in the card type camera 35 can be attained by manual adjustment, as shown in FIG. 9, by turning an outer barrel 21b of the image forming part 21.

A card type camera 37 as shown in FIG. 10 is formed in such a way that the image input unit 23b of the card type camera 35 as shown in FIG. 5 is fixed to the IC card unit 33, so that the card type camera 37 is simplified in construction. In this case, as shown in FIG. 11, when the card type camera 37 is fitted to the portable information device 36, the direction in which the surface of the display screen 36a extends and the direction of the optical axis of the lens 21a are fixedly set so as to be identical to each other.

Figure 12:
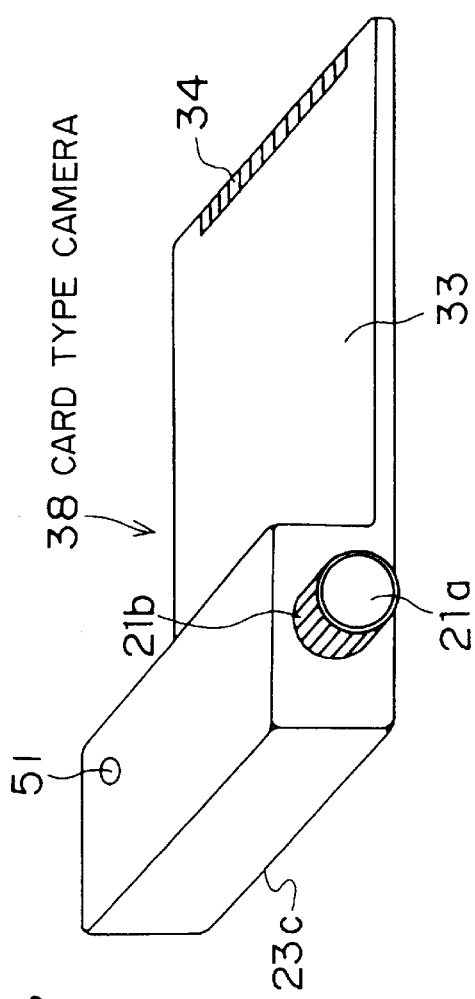
FIG. 12 is an external view of a card type camera of the present invention having a configuration different from those of FIGS. 5 and 10.
Figure 13:
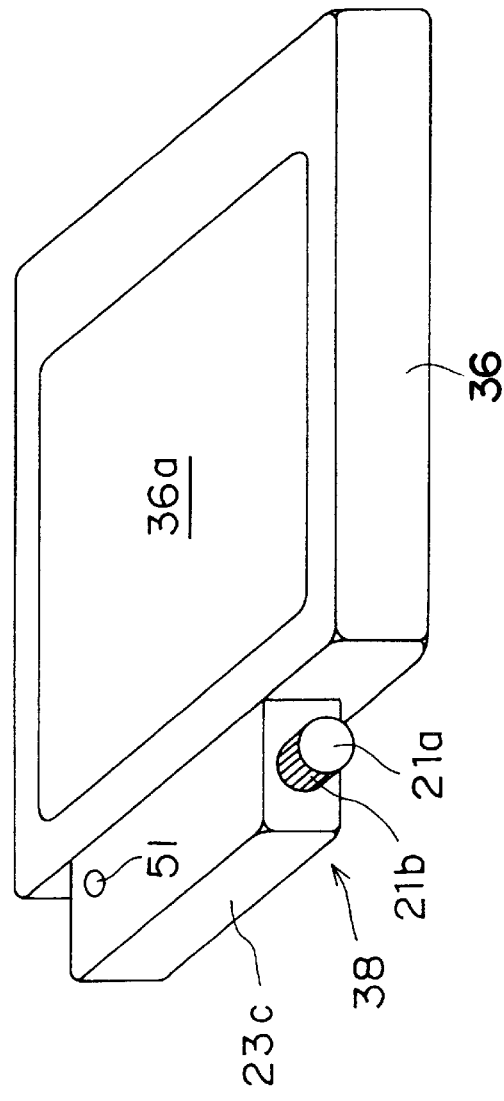
FIG. 13 is a view showing an example that the card type camera of FIG. 12 is fitted to a portable information device.

A card type camera 38 as shown in FIG. 12 is a modification of the card type camera 37 as shown in FIG. 10. In the card type camera 38, the lens 21a is attached beside an image input unit 23c. In this case, as shown in FIG. 13, when the card type camera 38 is fitted to the portable information device 36 and the display screen 36a is positioned horizontal, the lens 21a is directed leftward.

Figure 14:
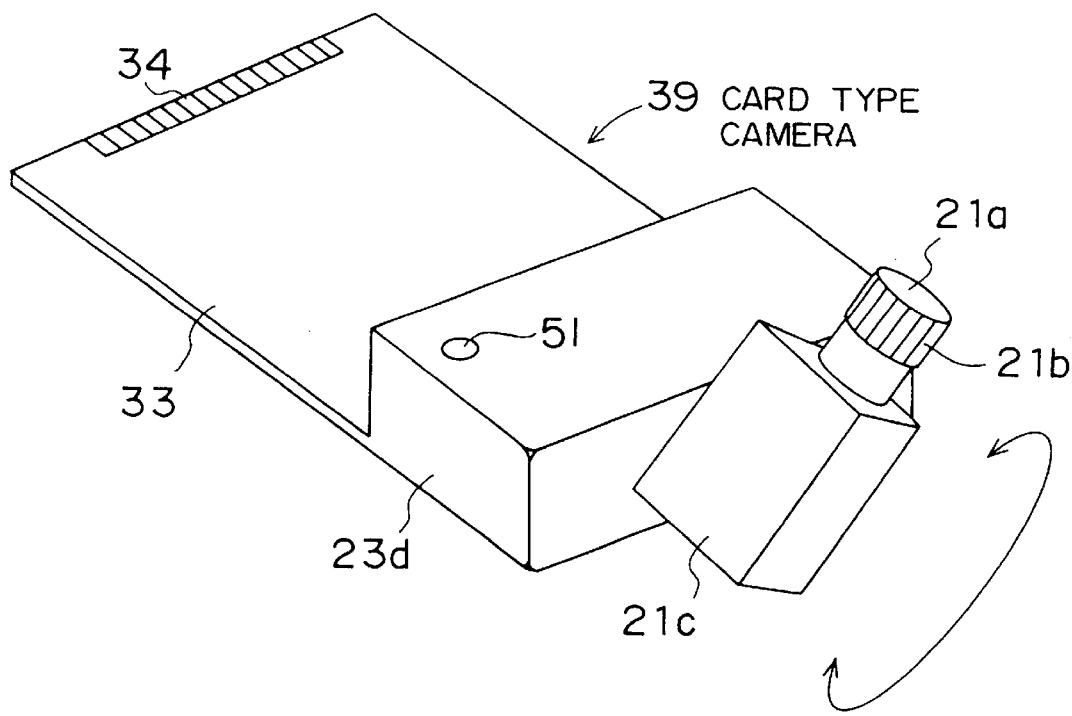
FIG. 14 is an external view of a card type camera of the present invention having a configuration different from those of FIGS. 5, 10, and 12.
Figure 15A:
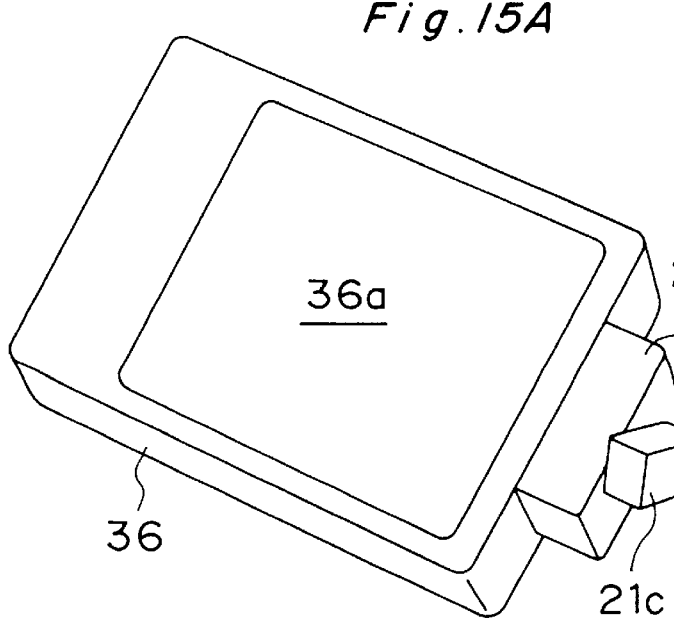
FIG. 15A and FIG. 15B are views showing operation examples of the image input unit of the card type camera of FIG. 14.
Figure 15B:
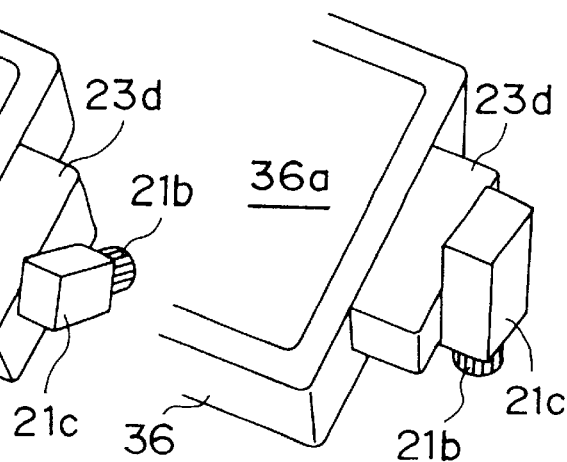

In a card type camera 39 as shown in FIG. 14, an image input unit 23d is provided with a movable mechanism so that an end portion is rotatable about the axis of the card type camera 39. Further, the lens 21a and its outer barrel 21b are provided on a side face of the rotating part 21c, whereby the image forming part 21 is formed at the rotating part 21c. In this case, as shown in FIGS. 15A and 15B, when the display screen 36a of the portable information device 36, to which the card type camera 39 is fitted, is positioned vertical, the optical axis of the lens 21a is rotatable through 360 degrees within a horizontal plane.

Figure 16:
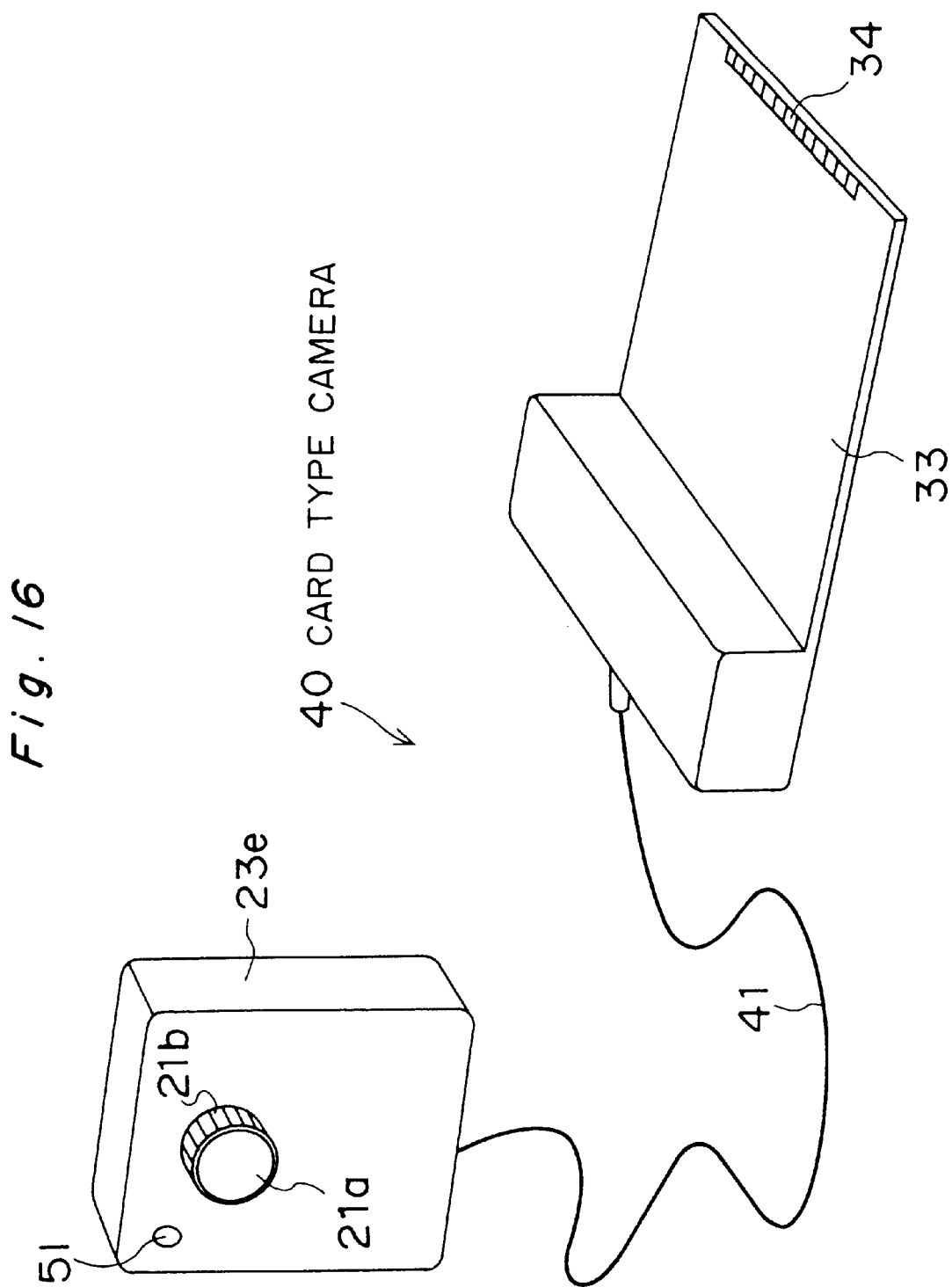
FIG. 16 is an external view of a card type camera of the present invention having a configuration different from those of FIGS. 5, 10, 12, and 14.
Figure 17:
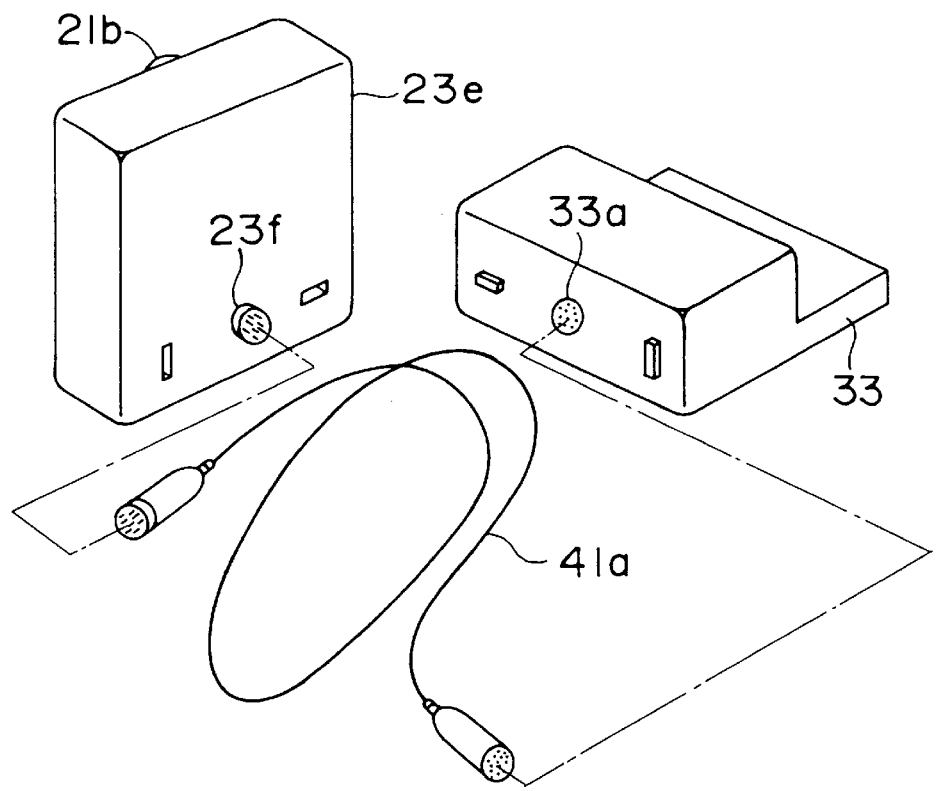
FIGS. 17 and 18 are each an explanatory view of the separation of the image input unit of the card type camera shown in FIG. 16 from the IC card unit.
Figure 18:
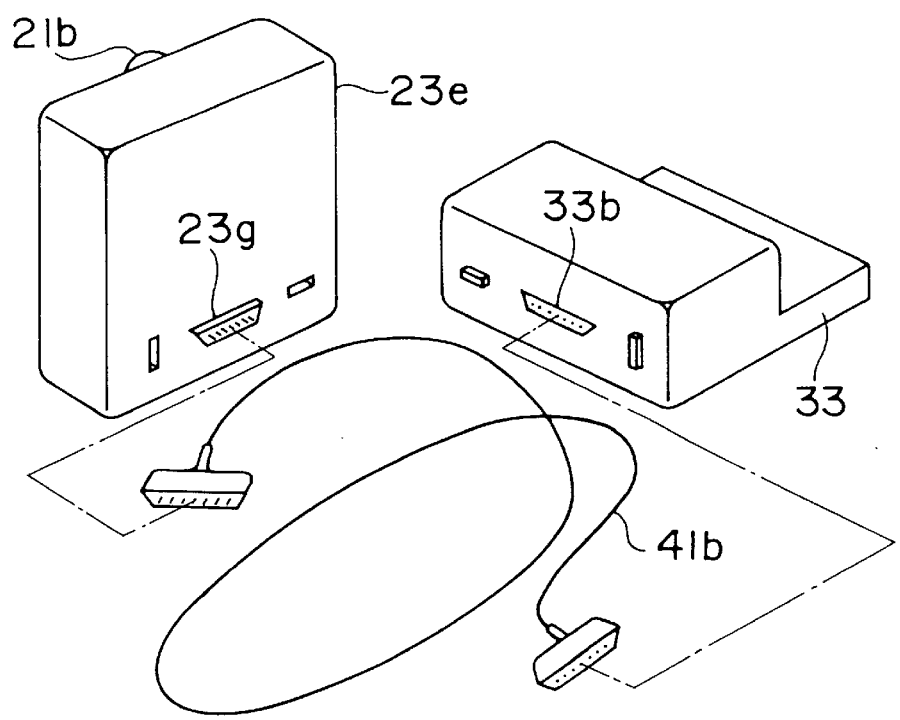

A card type camera 40 as shown in FIG. 16 is so arranged that an image input unit 23e and the IC card unit 33 are provided with connectors 23f, 33a or connectors 23g, 33b as the connecting and attaching mechanism, as shown in FIGS. 17 or 18, whereby the image input unit 23e is attachable to and removable from the IC card unit 33. When the image input unit 23e is separated from the IC card unit 33, both are connected to each other via the connectors 23f, 33a or 23g, 33b with a cable 41a or a cable 41b as the image data transfer mechanism. In this case, the lens 21a of the image input unit 23e can be directed in any direction freely without being restricted by the direction of the display screen 36a of the portable information device 36.

It is also possible that the image input unit 23e is provided independently of the IC card unit 33 so as not to be removable therefrom, where both are connected to each other with a cable 41.

In such a case, the arrangement may be cableless by using a radio transmission mechanism or an optical transmission mechanism as the image data transfer mechanism.

Figure 1:
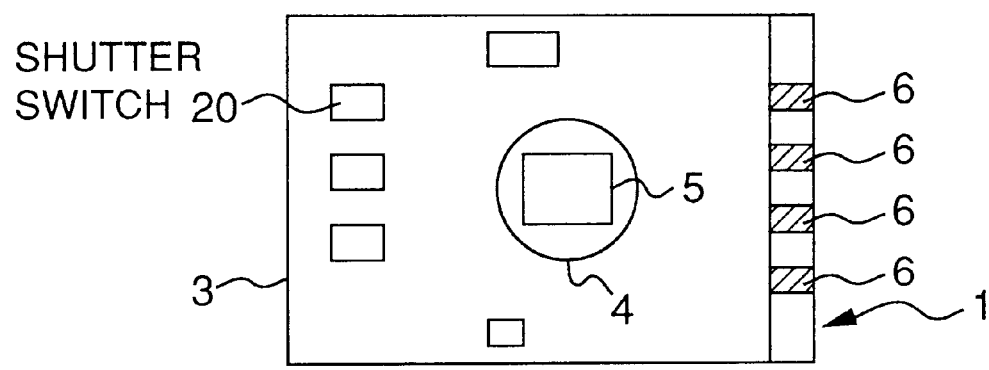
FIG. 1 is a front view of a conventional electronics still camera.
Figure 2:
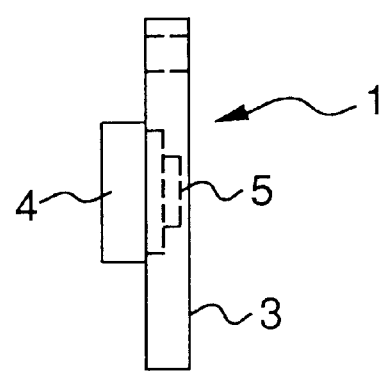
FIG. 2 is a side view of the electronics still camera of FIG. 1.
Figure 3:
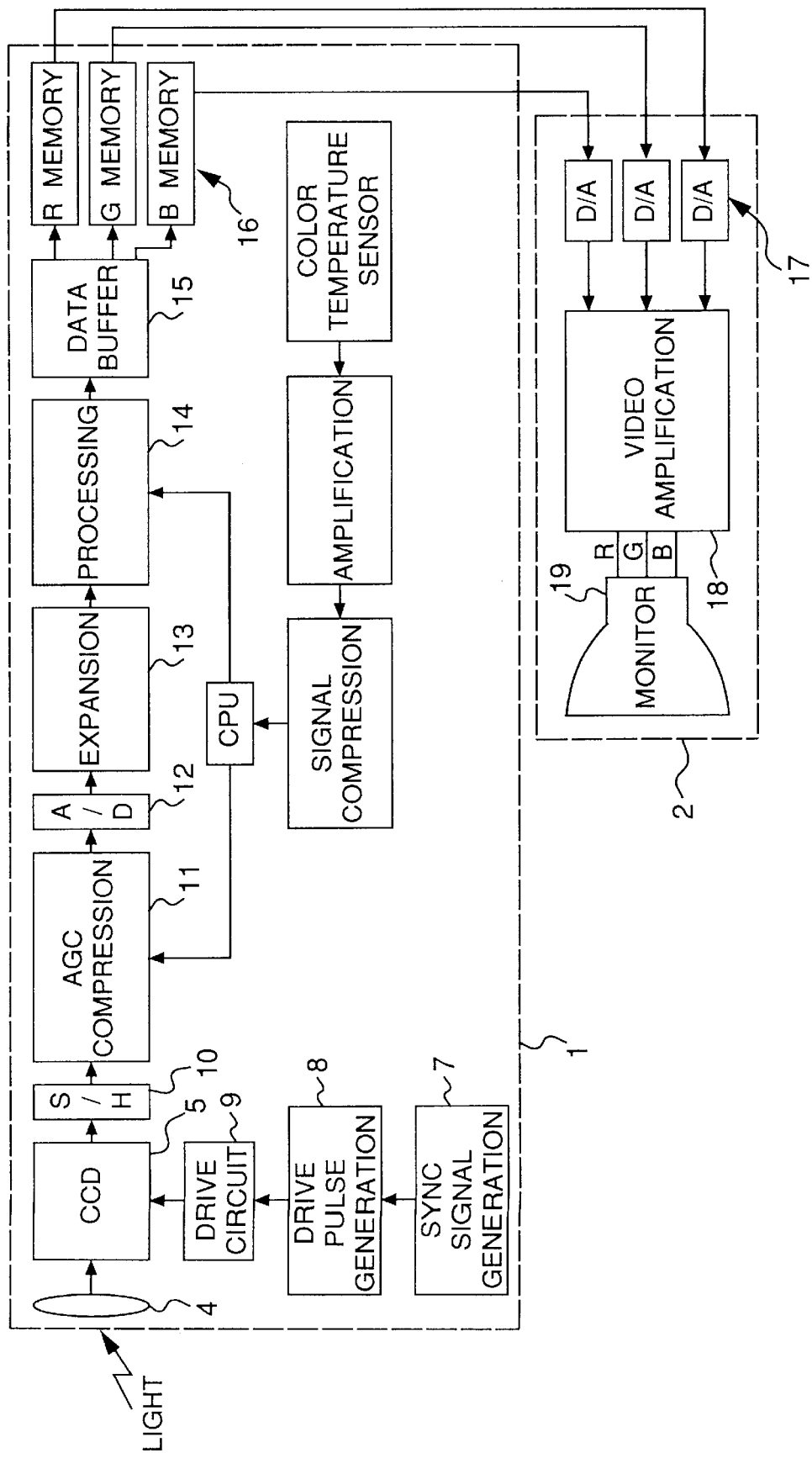
FIG. 3 is a block diagram of the electronics still camera of FIG. 1.

As described above, in the card type camera 35, 37, 38, 39, or 40 in the present embodiment, when it is fitted to the portable information device 36 with the image input unit 23a, 23b, 23c, 23d, or 23e provided at a side portion of the IC card unit 33 or independently thereof, the entire IC card unit 33 is contained in the portable information device 36 so as to be hidden, where only the image input unit 23 is projected out of the portable information device 36. As a result, the card type camera is very convenient to use because the entire IC card unit 33 generally prevented from being projected out of the portable information device 36, which would be involved in the conventional electronics still camera 1 shown in FIG. 1.

Further, in the card type camera 35 or 39 shown in FIG. 5 or 14, the movable mechanism is used so that the direction of the incident-side optical axis of the image forming part 21 is variable with respect to the direction in which the IC card unit 33 extends, i.e., the direction of the lens 21a is turnable. In the card type camera 40 shown in FIG. 16, the image input unit 23e is separated from the IC card unit 33. By these arrangements, the direction of subjects is not restricted by the direction of the display screen 36a of the portable information device 36, so that the card type camera becomes more convenient to use.

Figure 19:
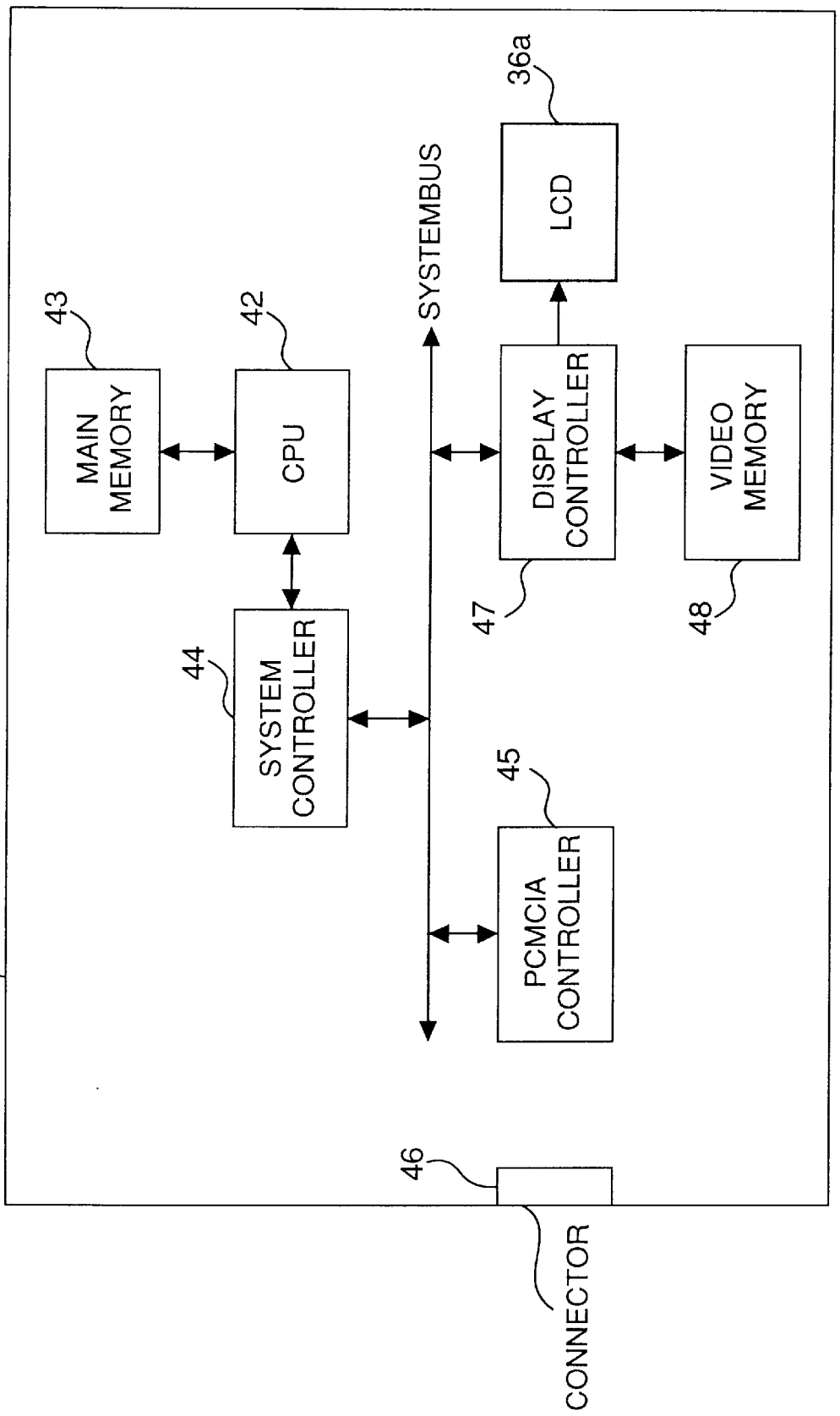
FIG. 19 is a schematic block diagram of the portable information device.

FIG. 19 is a block diagram of the portable information device 36. A CPU (Central Processing Unit) 42 controls a system controller 44 and a PCMCIA (Pulse Code Modulation Computer Interface Adapter) controller 45 according to a system program stored in a main memory 43 to thereby control the operation of image capture process performed by the card type cameras (hereinafter, typified by the card type camera 35) and operations of various types of image processing later described in detail. Further, by controlling the system controller 44, the PCMCIA controller 45, and a display controller 47, the CPU 42 displays an image onto a liquid crystal display (LCD) as the display screen 36a via a video memory 48 based on image data derived from the card type camera 35 and captured via the connector 46.

Figure 20:
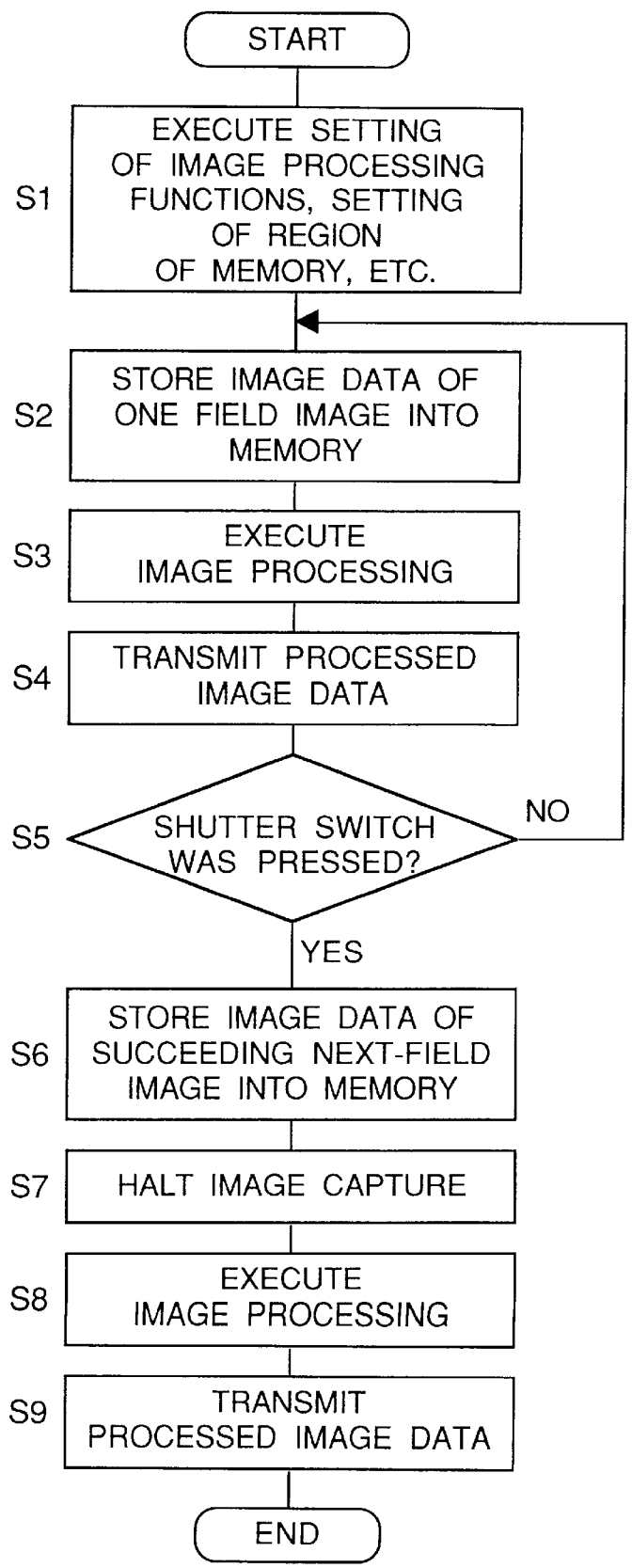
FIG. 20 is a flow chart of the operation of image capture process by the card type camera shown in FIG. 4.

Next described is the image capture process by the card type camera 35 of the above arrangement. FIG. 20 is a flow chart of the operation of image capture process to be executed on the card type camera 35 side under the control of the CPU 42 in the portable information device 36. The following description on the operation of image capture process goes on according to FIG. 20.

When a start of the operation of image capture process is instructed by the CPU 42, the operation of image capture process is started.

At step S1, such processes are executed as initializing registers of the IC card unit 33, setting functions of image processing to be executed, and setting a region of the memory 24 of which image data is transferred to the portable information device 36.

The functions of image processing to be executed in this step may be all of the image processing functions, i.e., the hand-move correction process, brightness conversion process, edge enhancement process, edge amount detection process, error diffusion process, and adaptive binarization process, or may be only the error diffusion process or the adaptive binarization process necessary for displaying an image onto the display screen 36a of the portable information device 36. The setting may be such that an image optimum for the image display of the information processing device to which the card type camera is fitted can be displayed.

At step S2, image data corresponding to one field image is grabbed by the image pick-up part 22 for the focusing adjustment, brightness conversion, and other processes, and digitized and stored in the memory 24.

At step S3, the image data of the one field image stored in the memory 24 is read from the region set at step S1, and the image processing set at step S1 out of the above-described image processing functions is executed on the read image data.

At step S4, the image data of the one field image that has undergone the image processing at step S3 is transmitted by the IC card interface 32 to the portable information device 36 via the IC card connector 34. Then, based on the image data transmitted in this way, an image is displayed on the display screen 36a on the portable information device 36 side.

It is intended to attain a high-speed image display with less amount of transferred information so that image data of only one field image is transmitted to the portable information device 36. In addition, since the purpose of image display based on transferred image data in this step is for monitoring during focusing adjustment and other processes, one-side field images will do for these processes.

At step S5, it is decided whether or not the shutter switch 51 provided in the card type camera 35 has been pressed, or whether or not a shutter operation has been instructed from the portable information device 36 side. As a result, if the shutter switch 51 has been pressed or if the shutter operation has been instructed (hereinafter, both expressed collectively and simply as "the shutter switch has been pressed"), the program goes to step S6. Meanwhile, if the shutter switch has not been pressed because a desired image is not displayed on the display screen 36a, the program returns to step S2 to fetch the next one field image.

Thus, one field image will be displayed one after another on the display screen 36a in the portable information device 36 until the shutter is pressed. While this is done, manual focusing adjustment is performed, for example in the above-described manner, by the operator referring to the images displayed one by one on the display screen 36a. Then, if the shutter switch is pressed by the operator with a desired image displayed on the display screen 36a, it is decided at step S5 that the shutter switch has been pressed, where the program moves to step S6.

At step S6, image data of the next field image that succeeds the field image captured upon pressing of the shutter switch is captured by the image pick-up part 22, and digitized and stored in the memory 24.

At step S7, now that the frame image has been captured in the memory 24, image capture is halted.

At step S8, the image processing set at step S1 is executed on the image data of the frame image stored in the memory 24.

It is noted that whereas the purpose of image processing to be executed at step S3 is in any case to display a monitoring-oriented image onto the display screen 36a of the portable information device 36, the present step is designed for primary image processing such as hand-movement correction to be executed on the frame image captured by the operator.

At step S9, image data of the frame image that has undergone the image processing at step S8 is transmitted by the IC card interface 32 to the portable information device 36 via the IC card connector 34, where the operation of image capture process is ended.

Thereafter, on the portable information device 36 side, an image is displayed on the display screen 36a based on the image data transmitted in this way, the transmitted image data is stored in the main memory 43, or other processes are carried out.

As seen above, the card type camera 35, when fitted to the portable information device 36, functions as if it were one camera unit. For the process of focusing adjustment by the operator or other processes, one field image of a subject is captured and subjected to the error diffusion process, adaptive binarization process, and other processes, and displayed in real time on the display screen. 36a of the portable information device 36. Then, if the shutter switch 51 is pressed with an optimum image obtained, image data of frame images including the above one field image and the next field image is captured and stored in the memory 24. Thereafter, the frame image data is subjected to the previously set image processing, such as the hand-move correction process, and transmitted to the portable information device 36.

In this process, the image to be displayed in real time on the display screen 36a is displayed based on the image data that has undergone the image processing such as the error diffusion process and adaptive binarization. process. Therefore, the image display that displays an image on the display screen 36a, whether an image display or a liquid crystal display capable of multi-level halftone display, is enabled to display a high-grade image.

In the above operation of image capture process, it has been arranged that various types of image processing are performed by the card type camera 35 upon image data of one field image or one frame image captured and stored in the memory 24. However, it may also be arranged that an image stored in the memory 24 is read directly from the portable information device 36 side. In this case, a high-grade image can be obtained by executing the image processing as described above on the portable information device 36 side.

Figure 21:
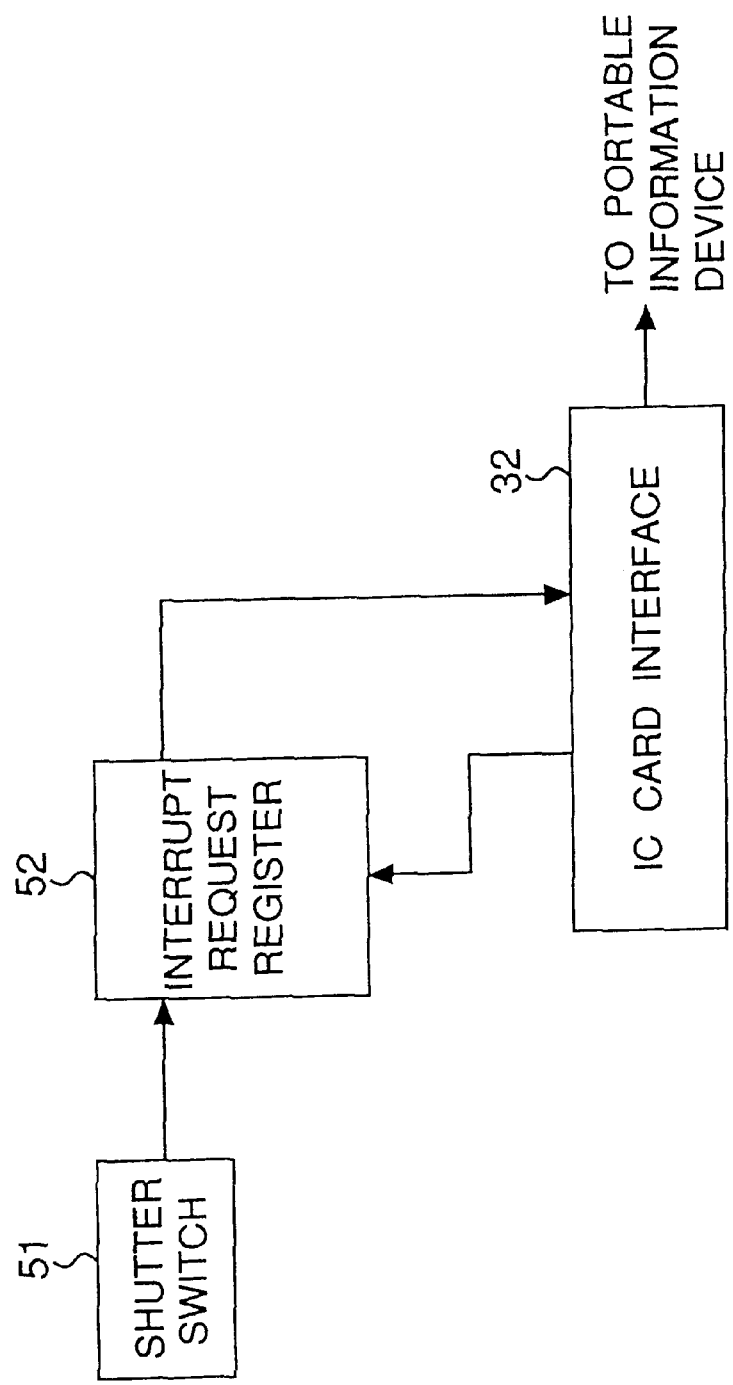
FIG. 21 is a block diagram for the operation of pressing the shutter switch in the card type camera shown in FIG. 4.

FIG. 21 is a block diagram for the shutter switch pressing operation. When the shutter switch 51 provided in the image input unit 23 of the card type camera 35 is pressed, information representing an interrupt request from the shutter switch 51 is written into an interrupt request register 52 while an interrupt signal is transmitted to the IC card interface 32. Then, the interrupt signal is transmitted by the IC card interface 32 to the portable information device 36 via the IC card connector 34.

In this process, if the portable information device 36 side needs to search the cause of an interrupts because another interrupt signal is wired-ORed with the pertinent interrupt signal, the CPU 42 of the portable information device 36 accesses the interrupt request register 52 via the IC card interface 32. Then, when it detects the information representing an interrupt request derived from the shutter switch 51, it confirms that the interrupt is one due to a press of the shutter switch.

On the portable information device 36 side, when, it receives the interrupt signal derived from the shutter switch 51 or when it has confirmed an interrupt request due to a press of the shutter switch, it is decided whether or not interrupt processing is currently possible. If the interrupt processing is impossible, the CPU 42 displays so on the display screen 36a. On the other hand, if the interrupt processing is possible, the CPU 42 transmits a sound signal to the card type camera 35 side, causing the shutter sound generator 49 to generate a shutter sound. After these processes are completed, the image data capture control for the next frame image is executed.

It is noted that the interrupt request information derived from the shutter switch 51 and written in the interrupt request register 52 is cleared by access (read or clear request) from the portable information device 36 side.

Hereinbelow, the individual processes of image processing are described in detail, including the hand-move correction process to be executed by the hand-move corrector 26 in the IC card unit 33, the brightness conversion process to be executed by the brightness converter 27, the edge enhancement process to be executed by the edge enhancer 28, the edge amount detection process to be executed by the edge amount detector 29, the error diffusion process to be executed by the error diffuser 30, and the adaptive binarization process to be executed by the adaptive binarizer 31.

<Hand-move Correction Process>

When a photograph is taken with the card type camera 35 fitted to the portable information device 36, it is often the case that the entire system is hand-held for photographing, without being fixed to a tripod or the like. Unfortunately, in the case of such hand-held photographing, shifts due to hand-movement are likely to occur between succeeding field images, so that a still image obtained by two field images in succession would greatly deteriorate in image grade.

In order to correct such shifts between succeeding field images, shift amount between the two field images is first determined by making use of representative-point matching. The shift amount determined is used as an offset value of address for reading image data of either one of the two field images from the memory 24. By so doing, the shift amount between the two field images can be corrected and a high-grade still image can be obtained.

Figure 22:
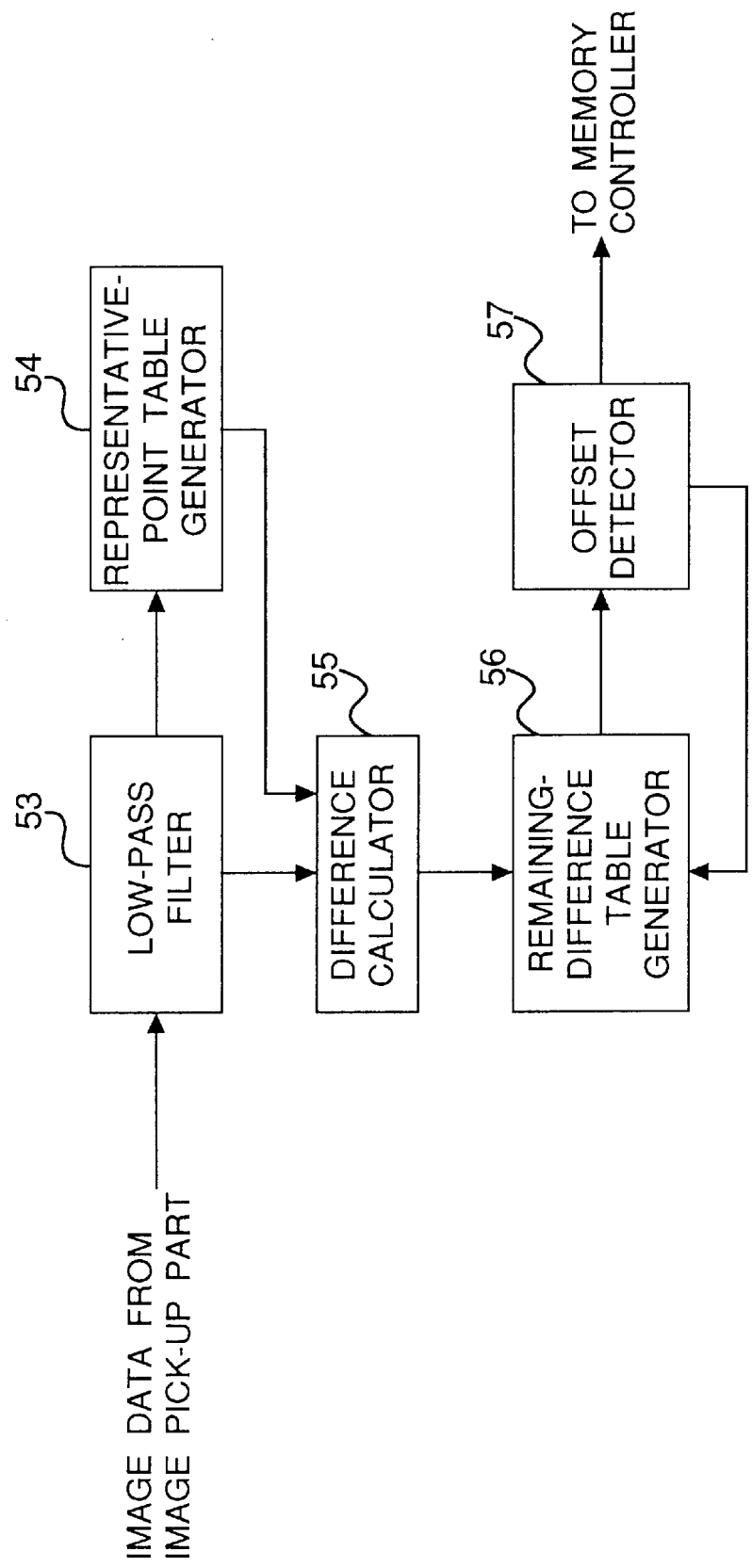
FIG. 22 is a detailed block diagram of the hand-move corrector in FIG. 4.

FIG. 22 is a detailed block diagram of the hand-move corrector 26.

Image data of one field image (e.g., an odd-field image) at a time point captured by the image pick-up part 22 is inputted to a low-pass filter 53. Then, noise components of the image are removed by an IIR (Infinite Impulse Response) low-pass filter using image data of an attentional pixel, a one-line preceding pixel, and a one-pixel preceding pixel out of the image data of the odd-field image.

Thus, a plurality of representative points (representative pixels) are selected out of the odd-field image data that has had noise components removed, and stored in a representative-point table by a representative-point table generator 54.

Next, image data of an even-field image succeeding the odd-field image is captured and has its noise components removed by the low-pass filter 53 in the same way as above. Then, a matching process is executed between the individual pixels of the even-field image data that has had noise components removed, and the representative points. The matching process in this case is executed within a specified search range (n pixels×m pixels) where the pixel corresponding to the representative point is positioned as (1, 1).

More specifically, a difference between the brightness value of each representative point in the representative-point table and the brightness value of each pixel within the above search range corresponding to the representative point in the even-field image data is calculated by a difference calculator 55.

The brightness value of a pixel in the even-field image data in this case is determined by an average value of the brightness values of pixels that are adjacent to each other on succeeding two lines in the pertinent even-field image data. This is because a frame image is composed of an odd-field image and an even-field image, and a line of the even-field image exists between the succeeding two lines of the even-field image.

A remaining-difference table generator 56 generates a remaining-difference table by adding an absolute value of the difference obtained by the difference calculator 55 to like elements in all the matrices associated with all the representative points. This addition process is executed sequentially, and the contents of the remaining-difference table that are effective upon completion of the processing for the succeeding two field images are taken as the matching result.

An offset detector 57 searches an element showing a minimum value out of the remaining-difference table generated by the remaining-difference table generator 56. It detects the address of a searched element as the aforementioned offset value equivalent to the shift amount between the odd-field image and the even-field image.

If the above process is executed during a blanking period, an offset value can be detected for every two fields. In this case, if it is predicted that the offset value will be so large that the resolution cannot be ensured even with the hand-move correction process, the subsequent result of two fields is adopted.

The offset value detected in this way is transmitted to the memory controller 25, and used as correction data for reading the even-field image data from the memory 24.

Thus, by giving the above offset value to the read start address for reading either one of succeeding odd-field image data and even-field image data from the memory 24, the image data of the frame image can be read out so that there will not occur any shift between the odd-field image and the even-field image. As a result, an effective hand-move correction process can be achieved.

<Brightness Conversion Process>

In the image pick-up part 22, a γ-correction process is executed on an output signal from the CCD. However, there are some cases where the brightness value is desired to be changed according to the characteristics of the image display of the portable information device 36, to which the card type camera 35 is fitted, or where a brighter or darker image is desired to be displayed according to the brightness of the environment. In the former case, brightness conversion is performed by the brightness converter 27 based on the look-up table, while in the latter case the accumulation time of the CCD is controlled in the image capture process.

In either case, the brightness conversion conditions can be controlled from the portable information device 36 side, by the arrangement that information can be transferred bidirectionally by the IC card interface 32.

Figure 23:
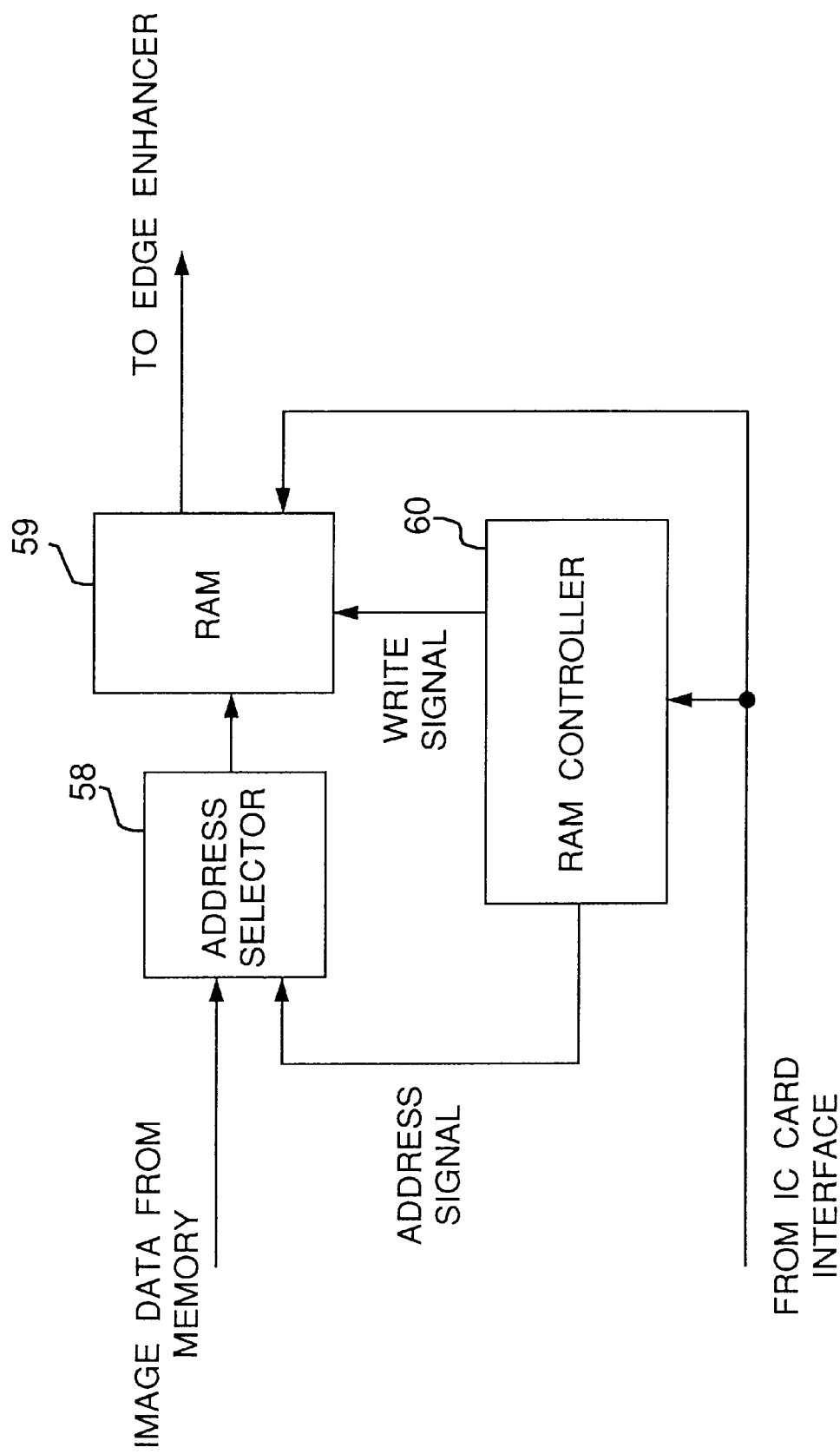
FIG. 23 is a detailed block diagram of the brightness converter in FIG. 4.

FIG. 23 is a detailed block diagram of the brightness converter 27.

An address selector 58 selects an address of a RAM (Random Access Memory) 59 in correspondence to the brightness value of an input image based on image data read from the memory 24 under the control of the memory controller 25. The RAM 59 is accessed based on the selected address so that a new brightness value in the look-up table stored in the RAM 59 is read and transmitted to the edge enhancer 28. That is, in short, the brightness value of an input image is converted into another by using the look-up table.

In this process, the brightness value can be converted into various brightness data by changing the contents of the RAM 59. Updating the contents of the RAM 59 in this process is achieved in the following way. That is, in synchronization with write control information inputted from the portable information device 36 side via the IC card interface 32, a RAM controller 60 generates an address signal and transmits it to the address selector 58. Further, the RAM controller 60 generates a write signal and transmits it to the RAM 59. Then, the RAM controller 60 writes a new element value (brightness data) of the look-up table fed from the portable information device 36 to an address of the RAM 59 selected by the address selector 58 based on the aforementioned address signal.

That is, the above write control information and new element value of the look-up table constitutes update information for the aforementioned conversion table.

As a result, display at a brightness according to the ambient conditions is enabled by allowing the brightness data written into the RAM 59 to be rewritten by an external information processing device. Also, for example, even if the image display of the information processing device is an image display that performs halftone expression by controlling the lighting time of pixels, display can be made at an optimum brightness according to the brightness characteristics of the image display. Further, whereas CRTs (Cathode-Ray Tubes) and LCDs differ in γ-characteristic from each other, brightness correction according to the γ-characteristic of the image display used becomes possible.

In addition, the present invention is not limited to this arrangement, but such brightness value conversion may also be carried out on the card type camera 35 side by using a ROM (Read only Memory) in which brightness data for use of brightness conversion has been written, instead of the RAM 59. In this case, if a plurality of ROMs in which brightness data for use of brightness conversion has been written are prepared and a ROM to be used is selected from the portable information device 36 side, then brightness data for use of brightness conversion can be changed from the portable information device 36 side.

<Edge Enhancement Process>

When focusing adjustment is insufficient so that the subject has not been focused enough, or when the value of MTF (Modulation Transfer Function) of the lens system is poor, a clear image can be obtained by executing the edge enhancement process on input image data. Such an edge enhancement process is more effective to emphasize the edges of character images.

Figure 24:
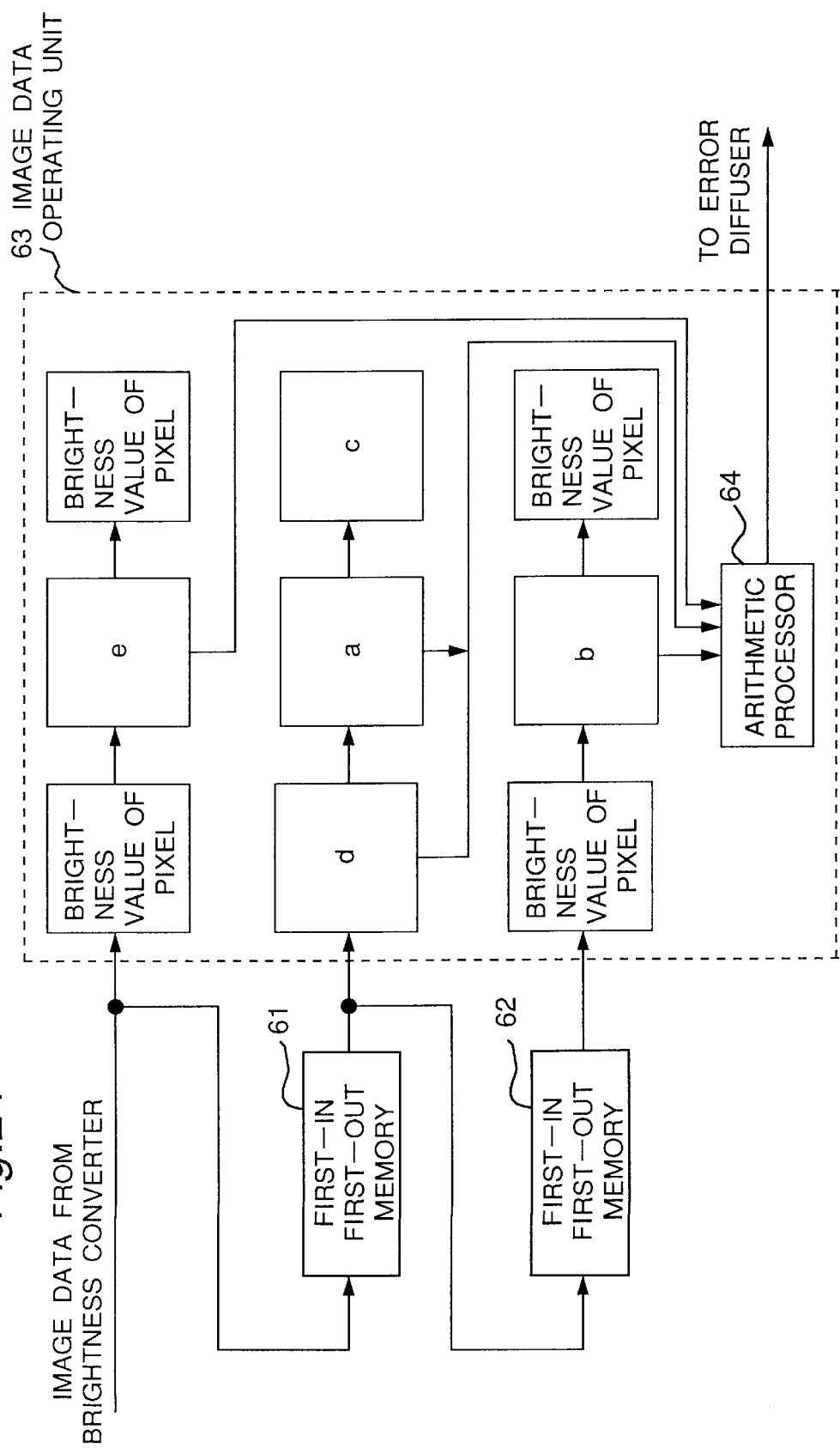
FIG. 24 is a detailed block diagram of the edge enhancer in FIG. 4.

FIG. 24 is a detailed block diagram of the edge enhancer 28.

Image data that has undergone the brightness conversion process by the brightness converter 27 is delayed by a first-in first-out memory 61. The delayed image data is further delayed by another first-in first-out memory 62. By using two-line image data delayed in this way and one-line image data not delayed, the brightness value of an attentional pixel "a" and the brightness values of its neighboring four pixels "b", "c", "d", and "e" are stored in an image data processing unit 63. An arithmetic processor 64 converts the brightness value A of the attentional pixel "a" into a new brightness value A' with the use of the brightness values of the above pixels "a" through "e" by the following equation. Thus, edge enhancement is achieved by enhancing the brightness value of an attentional pixel.

$$A'=3A-\tfrac{1}{2}(B+C+D+E)$$

where B, C, D, and E are brightness values of the pixels "b", "c", "d", and "e", respectively.

In this process, if the edge enhancement process is applied to all the pixels, noise components are also emphasized such that a poor-grade image would result unexpectedly. Thus, the edge enhancement process is executed selectively only on pixels which are desired to be emphasized. That is, the arithmetic processor 64 decides what extent the brightness values of the neighboring four pixels "b", "c", "d", and "e" have changed relative to the brightness value of the attentional pixel "a". For example, for a 256-level halftone input, if one of the values, |A–B|, |A–C|, |D–D|, and –A–E| is not less than "32," then the attentional pixel "a" is regarded as a pixel that needs the edge enhancement process.

Thus, the arithmetic processor 64 executes the brightness conversion upon attentional pixels that have been regarded as needing the edge enhancement process, while it outputs the brightness value, as it is, for attentional pixels regarded as not needing the edge enhancement process.

It is noted that the varied value "32" of brightness for deciding the need of edge enhancement process may also be set to an optimum value, as required, depending on how the enhancement is made. Besides, it may be made adaptively changeable depending on the brightness of the entire image or the like.

Such an edge enhancement process, if executed on image data captured by the image input unit 23, allows edge portions to be retained in the subsequent error diffusion process as much as possible, or allows fine portions to be kept from being lost in the adaptive binarization process.

<Edge Amount Detection Process>

In order to attain focusing adjustment manually in the card type camera 35, it is necessary to know the focusing state (focusing adjustment state) by some way during the process of image capture.

In this connection, when a subject is focused, the amount of high-frequency components contained in the image becomes a maximum at a point of just focusing, naturally. Also, if the number of pixels having a brightness difference of "32" or more from those of neighboring four pixels and therefore needing the edge enhancement process by the arithmetic processor 64 in the edge enhancer 28 (i.e., pixels located at edges) is counted (i.e., the edge amount is detected), the relative amount of high-frequency components contained in the image can be known. Accordingly, it is proper to perform the focusing adjustment in such a way that the edge amount becomes a maximum by using the edge amount as the focusing state.

Therefore, the edge amount detector 29 is arranged in the same way as the aforementioned edge enhancer 28. Then, its arithmetic processor counts the number of pixels "a" having a value equal to or more than "32" in any one of the values |A–B|, |A–C|, |A–D|, and |A–E|, which are differences in brightness value from those of the four neighboring pixels "b", "c", "d", and "e". The resulting count value is transmitted as the edge amount to the IC card interface 32.

The CPU 42 in the portable information device 35 reads the edge amount via the IC card interface 32, decides the current focusing state in a manner as described below, and displays the decision result onto the display screen. 36a. Thus, the operator can attain the focusing adjustment by referring to the focusing state displayed on the display screen 36a.

A first focusing-state decision method is to make a decision by the absolute value of edge. That is, while a value representing the edge amount is displayed on the display screen 36a, the operator executes focusing adjustment by referring to the displayed value in such a way that the edge amount becomes a maximum.

A second focusing-state decision method is to make a decision by the direction of change in the edge amount. That is, with respect to the edge amount obtained from one field image captured at the last time in the loop of step S2 through step S5 in the flow chart of image capture process operation as shown in FIG. 20, a mark representing that the focusing is coming up nearer is displayed on the display screen 36a if the edge amount obtained from the one field image captured this time has increased; a mark representing that the focusing is going away farther is displayed if the edge amount has decreased; and a mark representing that the focusing is at a point of just focused is displayed if the edge amount is generally equal. The operator executes the focusing adjustment so that the mark of just focused will be displayed.

A third focusing-state decision method is to make a decision by holding a maximum value of edge amounts of images captured in succession in the loop of step S2 through step S5 in the flow chart of the image capture process operation and by comparing the edge amount of the image captured this time with the foregoing maximum value. That is, a mark representing that the focusing is coming up nearer is displayed on the display screen 36a if the comparison between the current edge amount and the maximum value has resulted in an increase; a mark representing that the focusing is going away farther is displayed if the comparison has resulted in a decrease; and a mark representing that the focusing is at a point of just focused is displayed if the comparison has resulted in an equality.

A fourth focusing-state decision method is to make a decision by normalizing the edge amount. That is, since the edge amount contained in an image varies depending on the brightness or illuminated state of the subject, the edge amount is normalized while the increasing/decreasing rate of edge amount is obtained by dividing an edge amount of an image captured this time by the foregoing maximum value of edge amount. By so doing, a focusing state free from any effect of the absolute value of edge amount can be decided.

Also, any erroneous decision in making a decision of focusing state can be avoided by passing the edge amount obtained in this way through a proper low-pass filter.

As seen above, the edge amount detection process is a function that provides an aid for the focusing adjustment and that enhances the camera's user-friendly convenience. Accordingly, making use of the auxiliary function for focusing adjustment facilitates the operation of focusing adjustment under the viewing of, for example, a poor-contrast LCD 36a.

When the focusing adjustment is accomplished in this way and the shutter switch 51 is pressed, one frame image is captured and the captured image data is subjected to the above-mentioned hand-move correction process, brightness conversion process, and edge enhancement process, and transmitted to the error diffuser 30 and the adaptive binarizer 31. This is followed by the error diffusion process for halftone display and the adaptive binarization process for less amounts of data or needs of contrast in character images.

<Error Diffusion Process>

The error diffusion process is a process of reflecting any error, which results from replacing a brightness value of one pixel with another brightness; value, upon the processing of thresholds for subsequent pixels, when the halftone level of an input image is rounded by using some number of set thresholds, whereby a multi-level halftone display is enabled with a less number of halftone levels by retaining the halftone information of the original image as much as possible.

Figure 25:
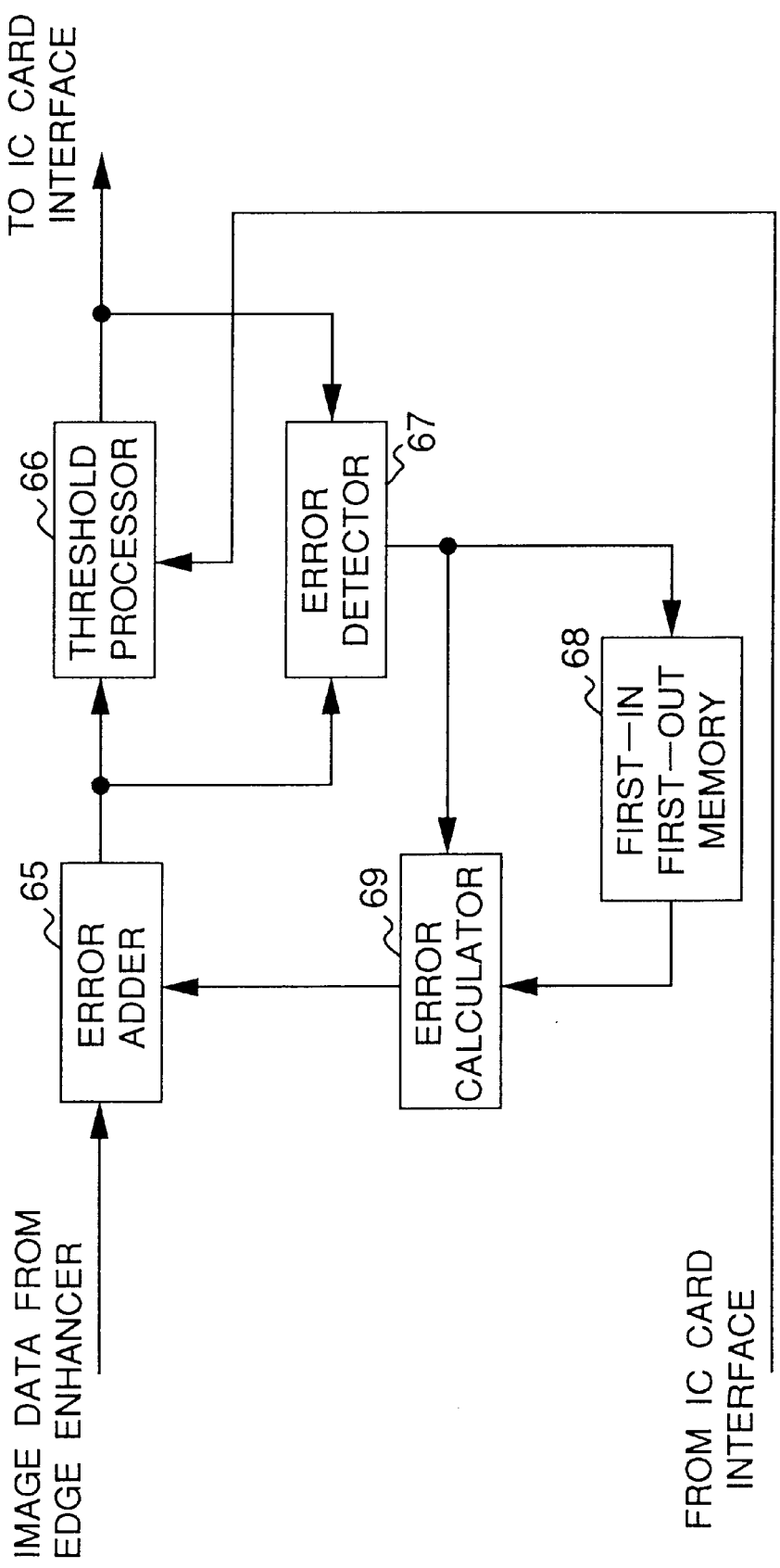
FIG. 25 is a detailed block diagram of the error diffuser in FIG. 4.

FIG. 25 is a detailed block diagram of the error diffuser 30.

An error adder 65 adds a value of error calculated by an error calculator 69 to the brightness value of an attentional pixel based on image data derived from the edge enhancer 28, thereby giving a brightness value of the pertinent pixel. Then, a threshold processor 66 executes threshold processing upon the new brightness value of the pertinent pixel obtained in this way according to a previously set threshold, and outputs a rounded brightness value to the IC card interface 32.

An error detector 67 detects an error between the unrounded brightness value derived from the error adder 65 and the rounded brightness value derived from the threshold processor 66. Then, the error detector 67 transmits the value of error detected to the error calculator 69 and a first-in first-out memory 68.

Subsequently, the error calculator 69 multiplies four error values consisting of an error value related to a pixel one-pixel preceding the attentional pixel and error values related to three neighboring pixels one-line preceding the attentional pixel by their corresponding factors, respectively, based on an error value train derived from the error detector 67 and an error value train derived from the first-in first-out memory 68, and further averages them to determine the error value of the attentional pixel. It is noted that the above four factors are so set that their total becomes less than "1".

In this process, thresholds previously set in the threshold processor 66 and the number of them can be newly set via the IC card interface 32 from the portable information device 36 side. Such an arrangement allows the brightness of an input image represented in 8 bits (256-level halftone) to be selectively displayed in 1 bit (2-level) to 4 bits (16-level). Thus, halftone conversion matching the characteristics of the image display becomes possible.

<Adaptive Binarization Process>

A captured image contains shadows of the card type camera 35 itself, illumination dots, variations in ground intensity and others that the subject originally has, and the like. Therefore, when the image data is binarized with a constant threshold for displaying a black-and-white, two-level image on the display screen 36a, pixels that should properly be displayed black may be dissipated into white, or pixels that should properly be displayed white may be dirtied black. To avoid such disadvantages, the present embodiment is designed to perform an optimum binarization by adaptively changing the threshold value according to the brightness state of images.

Figure 26:
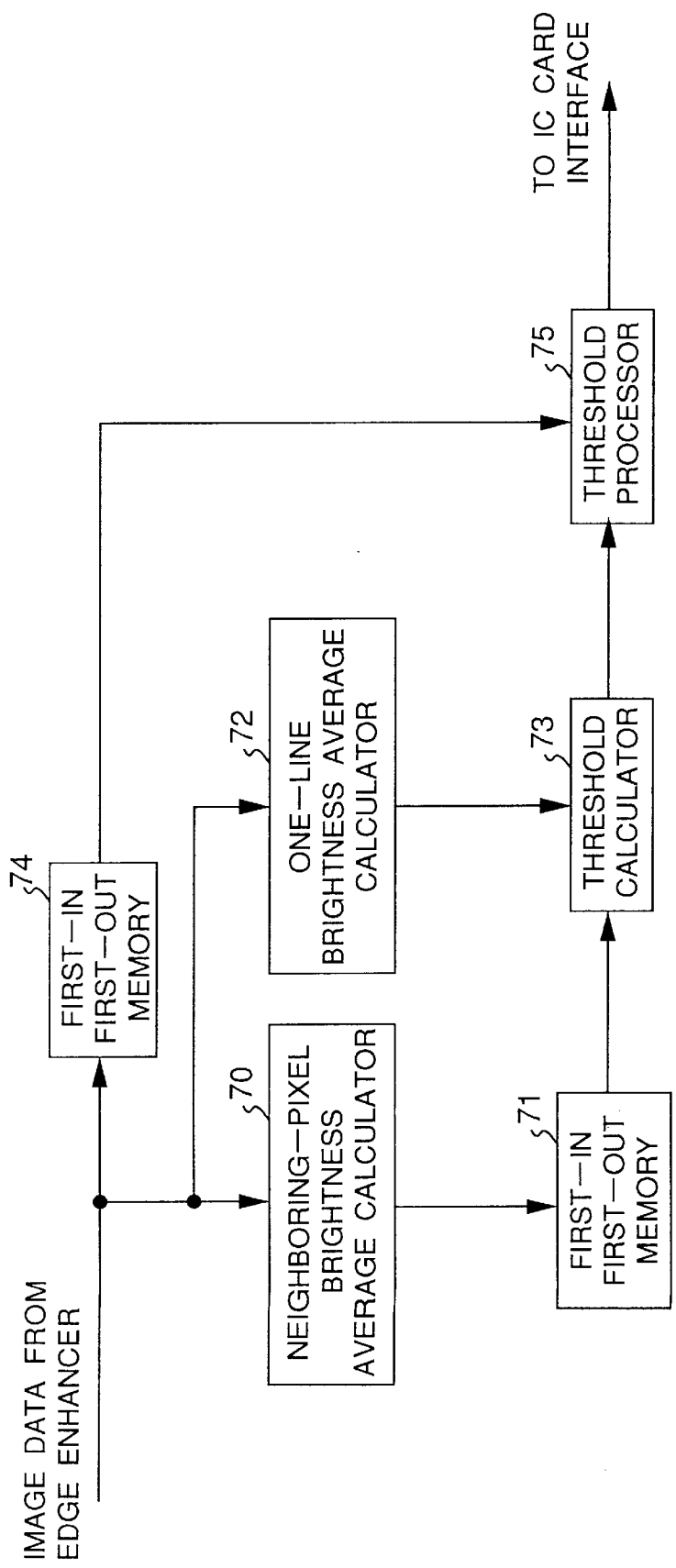
FIG. 26 is a detailed block diagram of the adaptive binarizer in FIG. 4.
Figure 27:
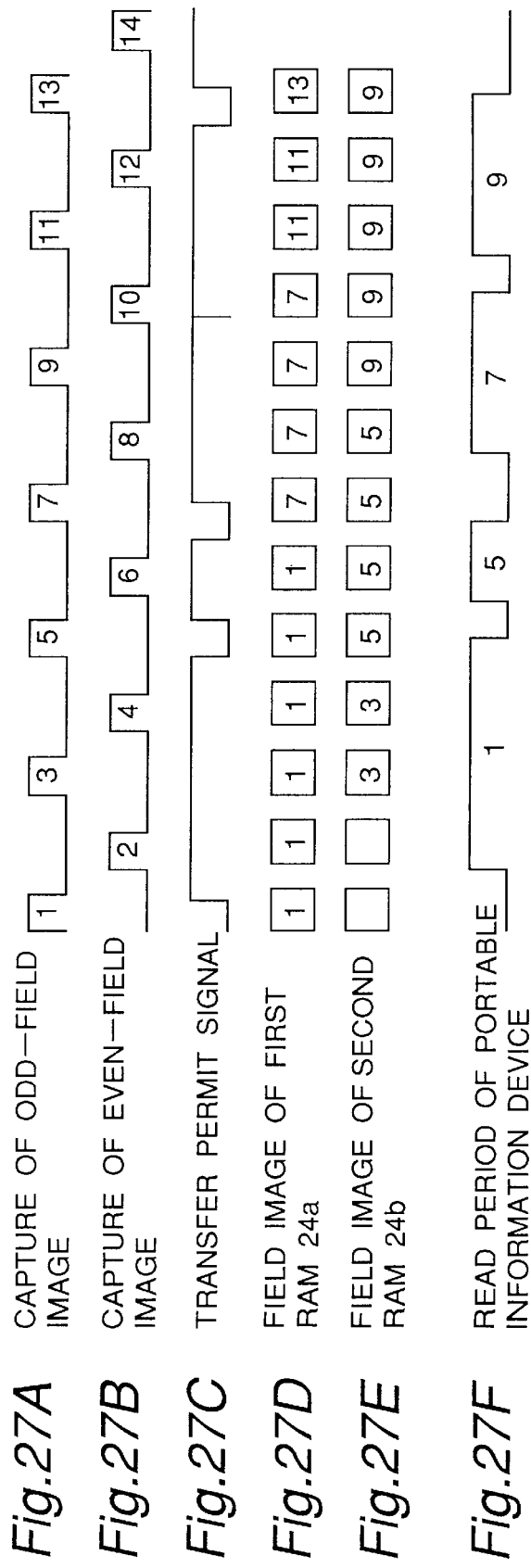
FIGS. 27A, 27B, 27C, 27D, 27E, and 27F are a timing chart for the process of reading image data from the portable information device side under monitoring.
Figure 28:
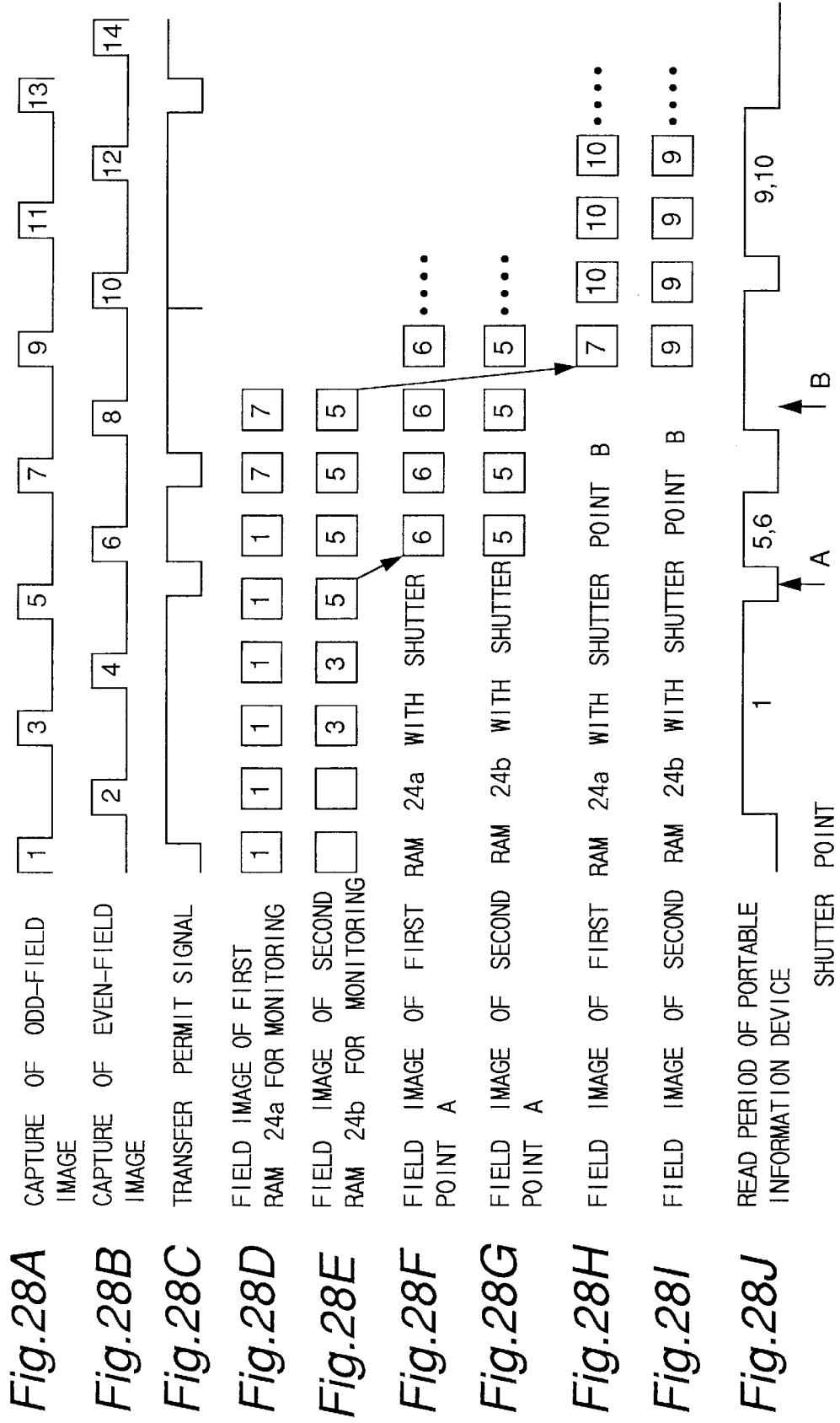
FIGS. 28A, 28B, 28C, 28D, 28E, 28F, 28G, 28H, 28I, and 28J are a timing chart for the process of reading image data from the portable information device side at a press of the shutter switch.

FIG. 26 is a detailed block diagram of the adaptive binarizer 31.

A neighboring-pixel brightness average calculator 70 calculates a brightness average value of neighboring pixels (16 to 64 pixels) present on a line on which the attentional pixel is present, based on the image data derived from the edge enhancer 28, and transmits the result to a first-in first-out memory 71. Also, a one-line brightness average calculator 72 calculates a brightness average value of all the pixels on the line on which the attentional pixel is present. Then, a threshold calculator 73 calculates a threshold based on the brightness average value of one line derived from the one-line brightness average calculator 72 and the brightness average value of neighboring pixels derived from the first-in first-out memory 71, by the following equation. The threshold calculator 73 transmits the resulting threshold to a threshold processor 75. The equation is set forth as:

$$th = k \cdot th_0 + (1-k)m$$

where th is a threshold to be determined;

$th_0$ is a brightness average value of neighboring pixels; and m is a brightness average value of one line.

The threshold processor 75 executes threshold processing by using the threshold derived from the threshold calculator 73 upon the brightness value related to the attentional pixel in the image data fed via a first-in first-out memory 74. The threshold processor 75 transmits the processing result to the IC card interface 32.

As seen above, in the present embodiment, the threshold for binarizing the brightness value for each attentional pixel is calculated and updated by adding a one-line general brightness variation to a brightness variation of the neighborhood of the attentional pixel. Accordingly, an adaptive binarization process becomes attainable in real time according to the brightness environment of ambient pixels.

As described above, the result of the error diffusion process by the error diffuser 30 and the result of the adaptive binarization process by the adaptive binarizer 31 are transferred by the IC card interface 32 to the information processing device, to which the card type camera is fitted. Then, on the information processing device side, the system controller 44 instructs the PCMCIA controller 45 to adopt and capture via the connector 46 either the result of error diffusion process or the result of adaptive binarization process depending on the display abilities of the display controller 47 and the display screen 36a, under the control of the CPU 42.

The image data captured in this way and subjected to the error diffusion process or the adaptive binarization process is transferred to the video memory 48 via a system bus, and displayed on the LCD 36a by the display controller 47.

In more detail, when the display controller 47 and the display screen 36a are capable of, for example, four-level halftone display, a threshold to be used by the threshold processor 66 of the error diffuser 30 is set front the portable information device 36 side, and the result of the error diffusion process obtained is adopted so that a halftone image by the four-level halftone display is displayed on the LCD 36a. Thus, a natural image of high grade can be displayed even by an LCD of low-level halftone display. In this case, image data in 8 bits (256 levels) per pixel of the captured image can be compressed in the amount of information at a rate of 2 bits (four levels) per pixel, so that 8-pixel image data can be transferred at one time by a 16-bit bus at high speed.

Meanwhile, when the display controller 47 and the LCD 36a are capable of only 2-level display, the result of the adaptive binarization process is adopted and a two-level image of high grade subjected to the adaptive binarization process is displayed on the display screen 36a.

In this way, on the card type camera 35 side, image data for halftone display by low-level halftone and image data for two-level display in correspondence to the ability of the image display of the information processing device are obtained at high speed by the error diffuser 30 and the adaptive binarizer 31, both integrated into LSI. Accordingly, an image can be displayed in real time on the information processing device side.

Also, by providing the card type camera 35 with both the error diffuser 30 and the adaptive binarizer 31 as described above, a high-grade image can be displayed whether the image display of the information processing device, to which the card type camera is fitted, is an image display capable of halftone display or an image display capable of displaying only two-level images. Further, by classifying images captured by the image input unit 23 into character images and natural images according to some method (classification by the user (manual classification) or automatic classification), an image of clear edges subjected to the adaptive binarization process by the adaptive binarizer 31 can be displayed in the case of character images, and natural images subjected to the error diffusion process by the error diffuser 30 can be displayed in the case of natural images.

As described above, in the present embodiment, one-frame image data captured into the memory 24 is subjected to the image processing such as the hand-move correction process, brightness conversion process, edge enhancement process, edge amount detection process, error diffusion process, and adaptive binarization process, and then transmitted to the portable information device 36 so as to be stored in the main memory 43 or displayed on the display screen 36a.

In contrast to this, it is also possible that unprocessed image data is read by accessing the memory 24 of the card type camera 35 from the portable information device 36 side via the IC card interface 32, and is subjected to the above-mentioned image processing by means of software under the control of the CPU 42. However, in such a case, the processing speed would be lower than in the case where the image processing sections are integrated into an LSI and the aforementioned image processing is executed by means of hardware, as in the present embodiment.

As described above, for the focusing adjustment or the brightness conversion, images for use of monitoring need to be displayed on the display screen 36a of the portable information device 36. In such a case, the portable information device 36 is required to capture images successively at high speed from the card type camera 35 side. Yet, in this process, an image transfer request is issued from the portable information device 36 asynchronously with the cycle at which the card type camera 35 captures images.

Thus, particularly for monitoring in focusing adjustment, only one-sided field (e.g., odd field) images are written into the memory 24 while even-field images are simply interpolated vertically between odd-field images to complete image data of a one-frame image. The one-frame image is delivered as such to the portable information device 36. By this arrangement, high-speed image data transfer is enabled with less storage amount.

FIGS. 27A, 27B, 27C, 27D, 27E, and 27F are a timing chart in the case where image data of odd-field images captured by the card type camera 35 is read from the card type camera 35 side asynchronously (corresponding to step S4 in the flow chart of image capture process; operation as shown in FIG. 20). For this process, in order that the portable information device 36 can read normally latest image data, the memory 24 has two RAMs, a first RAM 24a and a second RAM 24b. It is noted that the numbers in the figure are those of field images.

First, image data of the first field transmitted from the image pick-up part 22 is written into the first RAM 24a. Upon completion of this write operation, the transfer permit signal for the portable information device 36 goes "H" level. With the first RAM 24a read-enabled in this way, the portable information device 36 reads the image data of the first field from the first RAM 24a. When image data of the third field is transferred from the image pick-up part 22 during the first RAM 24a's operation, the data is written into the second RAM 24b.

Next, with image data of the fifth field transferred from the image pick-up part 22, if the first RAM 24a is still under operation (i.e., the portable information device 36 is under a read operation), the content of the second RAM 24b is rewritten with the image data of the fifth field. In this process, if the second RAM 24b is under operation (writing image data of the fifth field) even upon completion of the read operation from the first RAM 24a, a read operation is not permitted for the portable information device 36. When the writing of fifth-field image data into the second RAM 24b is completed, the reading is permitted and the fifth-field image data is read by the portable information device 36.

From this on, such operations will be repeated, whereby normally latest odd-field image data is transferred to the portable information device 36.

In contrast to this, when image capture is halted after image data of the succeeding-field image is captured with the shutter switch 51 pressed, the image data of captured frame images is read by the portable information device 36 at such timing as described below.

FIGS. 28A, 28B, 28C, 28D, 28E, 28F, 28G, 28H, 28I and 28J are a timing chart of reading image data at a press of the shutter switch (corresponding to step S9 in the flow chart of the image capture process operation as shown in FIG. 20).

Before the shutter switch 51 is pressed, image data of odd fields is written into the first RAM 24a and the second RAM 24b in the same manner as in the above-described monitoring state. When the shutter switch 51 is pressed at a shutter point A, the write address is controlled by the memory controller 25 so that images of both odd and even fields are written into the first RAM 24a and the second RAM 24b. As a result of this, at a time point when the sixth-field image is captured by the CCD, image data of successive field images is written into the first RAM 24a and the second RAM 24b.

When the write operation is completed in this way, image capture from the CCD is halted while reading from the first RAM 24a and the second RAM 24b is permitted. Then, by the portable information device 36, the sixth-field image data is read from the first RAM 24a while the fifth-field image data is read from the second RAM 24b. Thus, one frame image is read out.

Also, when the shutter switch 51 is pressed at a shutter point B, image data of successive field images has not yet been written into the first RAM 24a and the second RAM 24b at a time point when the ninth-field image is captured by the CCD. The image data of successive field images will not be written into the first RAM 24a or the second RAM 24b until the time point when the tenth-field image is captured. At this time point, accordingly, the image capture from the CCD is halted while reading from the first RAM 24a and the second RAM 24b is permitted.

Further, for monitoring in the focusing adjustment, it is important that an image captured by the image pick-up part 22 is displayed in real time on the display screen 36a of the portable information device 36. Thus, in the present embodiment, not all the odd-field image data written into the first RAM 24a or the second RAM 24b in the memory 24 is transferred to the portable information device 36, but image data of a small region in both RAMs is transferred according to a transfer address generated by the memory controller 25. By this arrangement, a high-speed transfer is enabled so that the monitoring in real time is enabled.

Figure 29:
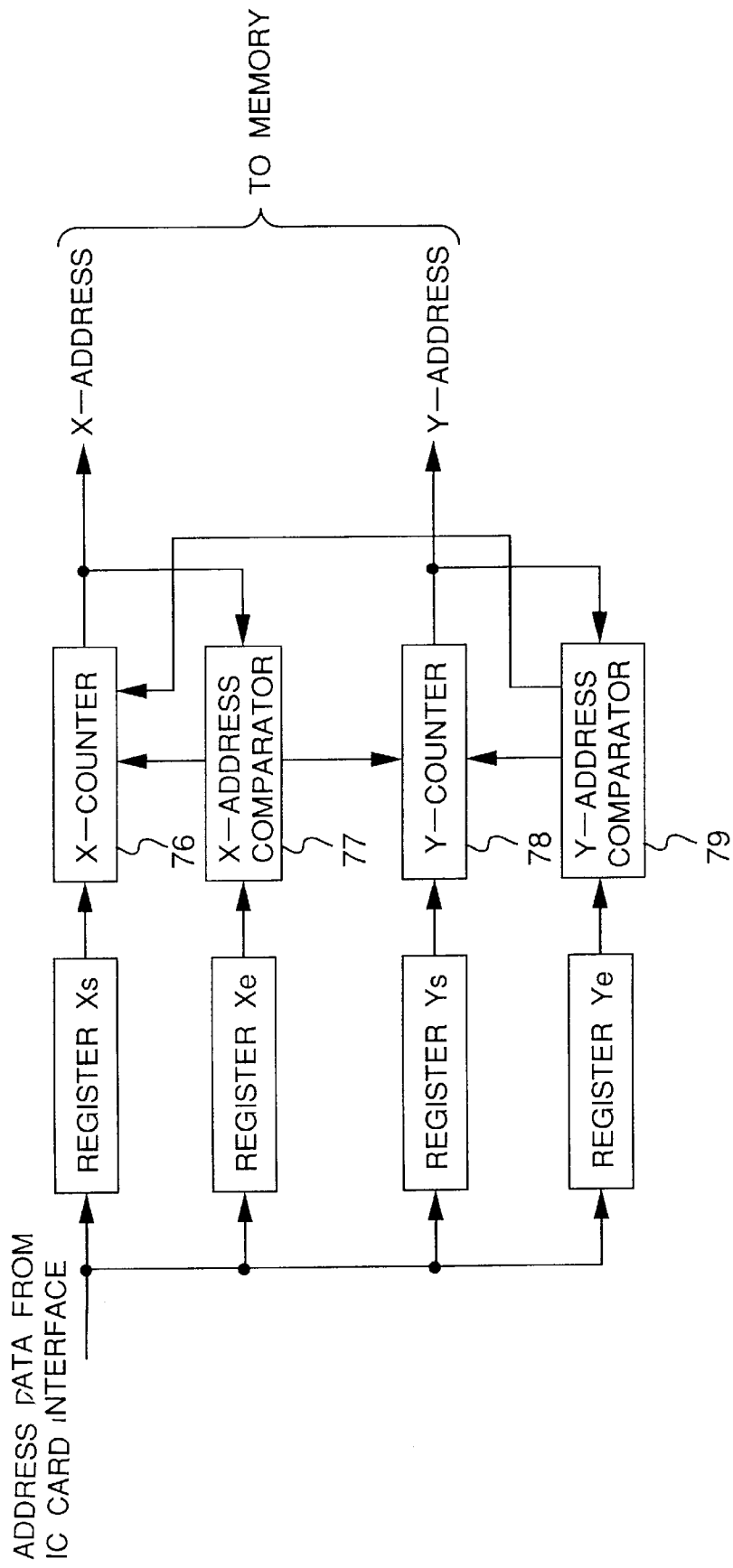
FIG. 29 is a block diagram for address generation by the memory controller in FIG. 4.

FIG. 29 is a block diagram for the generation of a transfer address of the first RAM 24a or the second RAM 24b by the memory controller 25.

When address data is transferred from the IC card interface 32, a start address in the X-direction is loaded to a register Xs according to the address data, an end address in the X-direction is loaded to a register Xe, a start address in the Y-direction is loaded to a register Ys, and an end address in the Y-direction is loaded to a register Ye.

Further, when a transfer request signal is transferred, the value of the register Xs is first loaded. to an X-counter 76 and the value of the register Ys is loaded to a Y-counter 78. Then, the X-counter 76 is incremented (decremented) so that the address is updated. In this process, the address signal from the X-counter 76 is transmitted to the memory 24 and an X-address comparator 77 normally as an x-address signal. On the other hand, the address signal from the Y-counter 78 is transmitted to the memory 24 and a Y-address comparator 79 normally as a y-address signal.

The X-address comparator 77 compares an address transferred from the X-counter 76 and an end address that has been loaded to the register Xe with each other. When they become equal to each other, the X-address comparator 77 loads the value of the register Xs to the X-counter 76 to increment (decrement) the X-counter 76. Further, it also increments (decrements) the content of the Y-counter 78. In this way, for the Y-counter 78 to be incremented (decremented), the Y-address comparator 79 compares an address transferred from the Y-counter 78 and an end address loaded to the register Ye with each other, where when they become equal to each other, it stops the X-counter 76 and the Y-counter 78 from operating.

In the way as described above, an x-address signal outputted from the X-counter 76 and a y-address signal outputted from the Y-counter 78 are used as a CAS (Column Address Strobe signal) and a RAS (Raw Address Strobe signal) for the first RAM 24a or the second RAM 24b, whereby image data can be transferred to the portable information device 36 with the read address automatically updated.

In this process, at step S1 in the flow chart of image capture process operation, the above start address and end address may be so designated that, for example, image data of a few lines is read every few lines from a field image. In this case, image data of a small region in the two RAMs is transferred so that high-speed monitoring in real time is enabled.

The addressing in the memory 24 is effective also for write operation. Accordingly, it is also possible that image data is written into the memory 24 at high speed from the portable information device 36 side with a write area for the memory 24 designated, and after the execution of various types of image processing as described above on the card type camera 35 side, processed image data is returned to the portable information device 36 once again.

As seen above, in the present embodiment, the card type camera has been made up from the image input unit 23, which comprises the image forming part 21 having the optical lens 21a and the image pick-up part 22 having a CCD and the like, and the IC card unit 33, which comprises in the form of an LSI the memory 24, various image processing sections, and the IC card interface 32. Therefore, the card type camera can be combined integrally with the portable information device 36 as if they were one unit camera, by inserting the IC card unit 33 into the slot 36b of the portable information device 36 as an external information processing device.

Accordingly, by executing the error diffusion process by the error diffuser 30 of the IC card unit 33, the adaptive binarization process by the adaptive binarizer 31 on the image data of an image captured by the image input unit 23, image data for use of halftone display and two-level tone display according to the ability of the image display of the portable information device 36 can be obtained at high speed, so that the image can be displayed in real time on the display screen 36a of the portable information device 36.

Also, a high-grade image can be displayed on the display screen 36a without being restricted by the ability of the image display.

Moreover, since the IC card unit 33 is contained in the portable information device 36 with only the image input unit 23 exposed, the card type camera is convenient for the user to use in photographing a subject.

Further, by executing the edge amount detection process by the edge amount detector 29 on captured image data, the relative amount of high-frequency components of the image can be detected, whereby the focusing state can be known on the portable information device 36 side. Accordingly, an optimum image can be photographed with focusing adjustment attained by referring to the focusing state in real time.

Also, by executing the hand-move correction process by the hand-move corrector 26 on captured image data, the shift amount between two field images constituting one frame image can be detected, whereby any hand movement can be corrected by giving an offset value to the read address for image data of either one of the two field images constituting the frame image.

Accordingly, the frame image can be used as image data of the photographed image, so that the vertical resolution will never deteriorate even with the use of a normal CCD.

Also in the present embodiment, since the IC card interface 32 is provided on the card type camera 35 side, the memory 24 or individual information processing sections of the card type camera 35 can be accessed also from the portable information device 36 side. Accordingly, it is possible to set element values of the look-up table to be used in the brightness conversion process, thresholds and the number of them to be used in the error diffusion process, start address and end address for the generation of memory addresses, and the like, from the portable information device 36 side.

Accordingly, according to the ability of the image display of the portable information device 36, the conversion into image data can be executed and the read/write time to the memory 24 can be shortened.

Furthermore, by arranging the lens 21a constituting the image forming part 21 of the image input unit 23 so as to be rotatable in its direction, or by separating the image input unit 23 from the IC card unit 33, the direction of the subject will never be restricted by the direction of the display screen 36a of the portable information device 36, making the card type camera more convenient to use.

Upon a press of the shutter switch 51 for capturing a frame image, when the pressing of the shutter switch is confirmed on the portable information device 36 side by an interrupt signal transferred by the IC card interface 32, a shutter sound is generated by the shutter sound generator 49 on the card type camera 35 side in response to a sound signal derived from the portable information device 36. Accordingly, the operator can confirm that image data of the aimed subject has been surely captured.

The above embodiment has been so arranged that the focusing state is decided by the CPU 42 of the portable information device 36 based on the edge amount obtained by the card type camera 35. However, the present invention is not limited to this arrangement, but the focusing state may also be decided on the card type camera 35 side.

Also, in the above-described card type cameras 35, 37, 38, 39, and 40, the focusing adjustment has been attained by manual operation. Otherwise, the auto focusing may be applied based on the decision result of focusing state on the information processing device side or the decision result of focusing state on the card type camera side.

Also, the above embodiment has been so arranged that image data is transferred in the order of the memory 24, the brightness converter 27, the edge enhancer 28, and the error diffuser 30. However, the present invention is not limited to this arrangement, but it is also possible to input image data derived from the memory 24, image data derived from the image pick-up part 22, or image data processed at any image processing section, to the individual image processing sections.

Also, the above embodiment has been described by taking an example of the portable information device 36 as an external information processing device to which the card type camera is fitted. However, the present invention is not limited to this case, but the external information processing device may be a personal word processor, a personal computer, or the like. In such a case, an image picked up with card type camera 35 fitted to the portable information device 36 can be processed by the personal computer or the like.

Also, in the above embodiment, the processing operations of the brightness converter 27, the edge enhancer 28, and the edge amount detector 29 have been described by taking a case where an image is displayed on an LCD. However, also when an image is displayed on a CRT or the like, similar operations are executed to attain "a display by a brightness according to the characteristics of an image display used," "an enhancement on edge portions," or "detection of a relative amount of high-frequency components contained in an image."

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An IC card camera comprising:
   an image input unit having an image forming part for forming an image of a subject on an image forming surface and an image pick-up part for capturing the image on said image forming surface and generating digital image data; and
   a camera body having a memory, a memory controller, and a connector, said camera body being directly coupled to said image input unit and being an IC card insertable into a card slot of an external information processing device,
   image data from said image input unit being stored in said memory and the stored image data being transferred to the external information processing device electrically connected to the IC card camera via said connector,
   said camera body further including
      image processing means for implementing image processing on image data transferred from said image input unit and on image data read from said memory, and
      an interface, connected to said connector and to said memory, said memory controller, and said image processing means, for enabling data transmission and reception between at least one of said memory, said memory controller and said image processing means, and the external information processing device.

2. The IC card camera according to claim 1, wherein said image processing means comprises:
   error diffusion means for implementing an error diffusion process on image data transferred from said image input unit and on image data read from said memory; and
   adaptive binarizing means for implementing an adaptive binarization process, in which a threshold is adaptively changed according to an ambient brightness, on image data transferred from said image input unit and on image data read from said memory.

3. The IC card camera according to claim 2, wherein said image processing means further comprises brightness conversion means for implementing a brightness conversion process on the image data by referring to a conversion table.

4. The IC card camera according to claim 2, wherein said image processing means further comprises edge enhancement means for implementing an edge enhancement process by which a brightness value of a pixel having more than a specified difference in brightness from brightness values of neighboring pixels is further enhanced based on the image data.

5. The IC card camera according to claim 2, wherein said image processing means further comprises edge amount detection means for detecting a number of pixels having more than a specified difference in brightness from brightness of neighboring pixels as an edge amount based on the image data.

6. The IC card camera according to claim 2, wherein said image processing means further comprises hand-movement correction means for detecting a shift amount between two field images constituting a frame image as an offset amount for a read address of either one of the two field images based on the image data transferred from said image input unit and transferring the offset amount to said memory controller as address information for reading the frame image from said memory.

7. The IC card camera according to claim 6, wherein said hand-movement correction means comprises:
   difference calculating means for calculating differences between brightness values of a plurality of representative pixels in either one of the two field images constituting the frame image and brightness values of all pixels in a specified area taking pixels in the other field image corresponding to the plurality of representative pixels each as a reference position, based on the image data transferred from said image input unit;
   remaining-difference table generating means for generating a remaining-difference table by adding absolute values of the differences relating to corresponding pixels in each specified area for every specified area, based on calculation results by said difference calculating means; and
   offset detecting means for detecting a shift amount from a reference position of an element that gives a minimum value in said remaining-difference table as an offset value for a read address of the other field image.

8. The IC card camera according to claim 1, further comprising:
   a shutter switch for outputting an interrupt signal when actuated; and
   a shutter sound generator for generating a shutter sound upon reception of a sound signal transferred from the external information processing device based on the interrupt signal,
   said interface enabling signal transmission and reception between said shutter switch and said shutter sound generator, and the external information processing device.

9. An IC card camera comprising:
   an image input unit having an image forming part for forming an image of a subject on an image forming surface and an image pick-up part for capturing the image on said image forming surface and generating digital image data; and a camera body having a memory, a memory controller, and a connector, said camera body being directly coupled to said image input unit and being an IC card, image data from said image input unit being stored in said memory and the stored image data being transferred to an external information processing device electrically connected to the IC card camera via said connector, said camera body being insertable into said external information processing device through a card slot provided in said external information processing device.

10. The IC card camera according to claim 9, wherein said image input unit is directly coupled to an end portion of said camera body on a side opposite to a side of said camera body which is insertable into said external information processing device, said image input unit protruding out of said external information processing device when said camera body is fitted to and electrically connected to said external information processing device.

11. The IC card camera according to claim 10, wherein said image input unit has a body and said image forming part is movably coupled with said body, a direction of an incident-side optical axis of said image forming part is changeable relative to a direction in which said camera body extends.

12. The IC card camera according to claim 9, wherein said image input unit is provided independently of said camera body, said image input unit comprising:

image data transfer means for transferring image data derived from said image input unit to said camera body.

13. The IC card camera according to claim 12, wherein said image input unit and said camera body each have connecting means for connecting said image input unit and said camera body to each other and attaching means for removably attaching said image input means and said camera body to each other, said image data transfer means transferring image data derived from said image input unit separated from said camera body to said camera body via said connecting means.

14. The IC card camera according to claim 9, further comprising:

a shutter switch for outputting an interrupt signal when actuated;

a shutter sound generator for generating a shutter sound upon reception of a sound signal transferred from said external information processing device based on the interrupt signal; and an interface for enabling signal transmission and reception between said shutter switch and said shutter sound generator, and said external information processing device.

15. An IC card camera comprising:

an image input unit having an image forming part for forming an image of a subject on an image forming surface and an image pick-up part for capturing the image on said image forming surface and generating digital image data;

a camera body having a memory, a memory controller, and a connector, said camera body being directly coupled to said image input unit and being an IC card, image data from said image input unit being stored in said memory and the stored image data being transferred to an external information processing device electrically connected to the IC card camera via said connector;

a shutter switch for outputting an interrupt signal when actuated;

a shutter sound generator, on the IC card, for generating a shutter sound upon reception of a sound signal transferred from said external information processing device based on the interrupt signal; and an interface for enabling signal transmission and reception between said shutter switch and said shutter sound generator, and said information processing device.

16. An IC camera comprising:

an imaging unit including imaging means for generating image signals corresponding to an image of a subject and image forming means for focusing the image of the subject on said imaging means; and a camera body having a processor and a memory, said processor processing the image signals generated by said imaging means and storing the processed image signals in said memory, said camera body being mounted to said imaging unit and being an IC card, said camera body being insertable into a card slot of an external information processing device for communication of processed image signals therebetween, only said imaging unit protruding from said external information processing device when said camera body is inserted into the card slot of said external information processing device.

17. The IC camera of claim 16, wherein said camera body is detachably mounted to said imaging unit.

18. The IC camera of claim 17, further comprising image data transfer means for transferring the image signals between said imaging unit and said camera body when said imaging unit and said camera body are detached.

19. The IC camera of claim 16, wherein said image forming means is adjustably coupled to said imaging means to have an optical axis which is directionally variable.

20. The IC camera of claim 16, wherein said camera body as inserted into said external information processing device is hand-held and portable.

21. The IC card camera of claim 16, further comprising:

a shutter switch for outputting an interrupt signal when actuated;

a shutter sound generator for generating a shutter sound upon reception of a sound signal transferred from said external information processing device based on the interrupt signal; and an interface for enabling signal transmission and reception between said shutter switch and said shutter sound generator, and said external information processing device.

22. An IC card camera comprising:

imaging means for generating image signals corresponding to an image of a subject;

an optical lens for focusing the image of the subject on said imaging means;

a memory, coupled to said imaging means, for storing the generated image signals;

processing means, coupled to said memory, for processing the stored image signals to provide processed image signals; and an IC card connector, coupled to said processing means, for providing the processed image signals to an external information processing device, said memory, said processing means and said IC card connector being on an IC card, said IC card being insertable into a card slot of the external information processing device, only said imaging means and said optical lens protruding from the external information processing device when said IC card is inserted into the card slot.

23. The IC card camera of claim 22, wherein said imaging means is mounted to an end of said IC card, the IC card camera further comprising:

coupling means for mounting said optical lens to said imaging means such that a direction of an optical axis of said optical lens relative to a longitudinal axis of said IC card is variable.

24. The IC card camera of claim 23, wherein said mounting means is a hinge mechanism.

25. The IC card camera of claim 22, wherein said processing means comprises:

error diffusion means, coupled to said memory, for performing an error diffusion process on the stored image signals to provide the processed image signals.

26. The IC card camera of claim 22, wherein said processing means comprises:

adaptive binarizing means, coupled to said memory, for performing an adaptive binarization process, in which a threshold is adaptively changed according to an ambient brightness, on the stored image signals to provide the processed image signals.

27. The IC card camera of claim 22, wherein said imaging means and said optical lens are removably coupled to said IC card.

28. An IC card camera comprising:

an image input unit having an image forming part for forming an image of a subject on an image forming surface and an image pick-up part for capturing the image on said image forming surface and generating digital image data; and an IC card camera body having a memory, a memory controller, and a connector, said IC card camera body being directly coupled to said image input unit and being connectable to an external information processing device, image data from said image input unit being stored in said memory and the stored image data being transferred to the external information processing device electrically connected to the IC card camera via said connector, said IC card camera body further including image processing means for implementing image processing on image data transferred from said image input unit and on image data read from said memory, and an interface, connected to said connector and to said memory, said memory controller, and said image processing means, for enabling data transmission and reception between at least one of said memory, said memory controller and said image processing means, and the external information processing device.

29. The IC card camera according to claim 28, wherein said image input unit is directly coupled to an end portion of said IC card camera body on a side opposite to a side of said IC card camera body which is connectable to the external information processing device, said image input unit protruding out of the external information processing device when said IC card camera body is fitted to and electrically connected to the external information processing device.

30. The IC card camera according to claim 29, wherein said image input unit has a body and said image forming part is movably coupled with said body, a direction of an incident-side optical axis of said image forming part is changeable relative to a direction in which said IC card camera body extends.

31. The IC card camera according to claim 28, wherein said image input unit is provided independently of said IC card camera body, said image input unit comprising:

image data transfer means for transferring image data derived from said image input unit to said IC card camera body.

32. The IC card camera according to claim 31, wherein said image input unit and said IC card camera body each have connecting means for connecting said image input unit and said IC card camera body to each other and attaching means for removably attaching said image input unit and said IC card camera body to each other, said image data transfer means transferring image data derived from said image input unit separated from said IC card camera body to said IC card camera body via said connecting means.

33. An IC card camera comprising:

an image input unit having an image forming part for forming an image of a subject on an image forming surface and an image pick-up part for capturing the image on said image forming surface and generating digital image data; and a camera body having a memory, a memory controller, and a connector, said camera body being directly coupled to said image input unit and being an IC card connectable to an external information processing device, image data from said image input unit being stored in said memory and the stored image data being transferred to the external information processing device electrically connected to the IC card camera via said connector, said camera body further including image processing means for implementing image processing on image data transferred from said image input unit and on image data read from said memory, and an interface, connected to said connector and to said memory, said memory controller, and said image processing means, for enabling data transmission and reception between at least one of said memory, said memory controller and said image processing means, and the external information processing device, said image input unit being directly coupled to an end portion of said camera body on a side opposite to a side of said camera body which is connectable to the external information processing device, said image input unit protruding out of the external information processing device when said camera body is fitted to and electrically connected to the external information processing device.

* * * * *